(12) United States Patent
Ciampa et al.

(10) Patent No.: US 9,837,805 B2
(45) Date of Patent: Dec. 5, 2017

(54) SYSTEM AND APPARATUS FOR ELECTRICALLY COUPLING TO A CABLE ON A ROTATABLE REEL USING OPTICAL COMMUNICATION DEVICES

(71) Applicants: Antoine Ciampa, Laval (CA); Gerald Edward Briggs, Ottawa (CA)

(72) Inventors: Antoine Ciampa, Laval (CA); Gerald Edward Briggs, Ottawa (CA)

(73) Assignee: RUGGEDREEL INC., Ottawa (CA)

( * ) Notice: Subject to any disclaimer, the term of this patent is extended or adjusted under 35 U.S.C. 154(b) by 206 days.

(21) Appl. No.: 14/691,198

(22) Filed: Apr. 20, 2015

(65) Prior Publication Data

US 2015/0325996 A1 Nov. 12, 2015

Related U.S. Application Data

(60) Provisional application No. 61/991,445, filed on May 9, 2014.

(51) Int. Cl.

| | |
|---|---|
| *H04B 10/00* | (2013.01) |
| *H02G 11/00* | (2006.01) |
| *H01R 35/02* | (2006.01) |
| *H02G 11/02* | (2006.01) |
| *H04J 14/00* | (2006.01) |

(52) U.S. Cl.
CPC ......... *H02G 11/003* (2013.01); *H01R 35/025* (2013.01); *H02G 11/02* (2013.01)

(58) Field of Classification Search
CPC .............................. G02B 6/3604; H04B 10/25
See application file for complete search history.

(56) References Cited

U.S. PATENT DOCUMENTS

| | | | |
|---|---|---|---|
| 3,061,234 A | 10/1962 | Morey | |
| 3,430,179 A | 2/1969 | Shoji | |
| 3,773,987 A | 11/1973 | Davis | |
| 4,234,139 A | 11/1980 | Porchia | |

(Continued)

FOREIGN PATENT DOCUMENTS

| | | |
|---|---|---|
| DE | 10029757 C1 | 10/2001 |
| EP | 1551086 A1 | 7/2005 |

(Continued)

*Primary Examiner* — Daniel Dobson
(74) *Attorney, Agent, or Firm* — Sean Murray; Murray IP Consulting Inc.

(57) ABSTRACT

A cable reel can improve transfer of power and data between a static frame and a cable wound around a rotatable element. The cable reel can use torsional springs to store mechanical energy and also to electrically couple the cable to a node within the static frame. This electrical coupling can be used to pass power. The cable reel can use a data transfer apparatus to transfer data between the frame and the cable. This apparatus may comprise two capacitive plates that together form a capacitor, one connected to the frame and one connected to the rotatable element. Alternatively, this apparatus may comprise an optically isolated zone in which an optical transmitter may communicate data to an optical receiver over free-space optical communications. The data can be transferred without physical contact between the frame and rotatable element, even while the rotatable element may rotate relative to the static frame.

30 Claims, 20 Drawing Sheets

(56) References Cited

U.S. PATENT DOCUMENTS

| | | | |
|---|---|---|---|
| 4,401,360 A * | 8/1983 | Streckmann | G02B 6/3604 |
| | | | 250/227.11 |
| 4,766,326 A | 8/1988 | Hayashi | |
| 4,940,194 A | 7/1990 | Young | |
| 5,152,477 A | 10/1992 | Yeh | |
| 5,160,972 A | 11/1992 | Walters et al. | |
| 5,176,331 A | 1/1993 | Horne | |
| 5,299,670 A | 4/1994 | Willard | |
| 5,453,585 A | 9/1995 | Lenz | |
| 5,775,922 A | 7/1998 | Kilstrom | |
| H1991 H | 9/2001 | Bolen | |
| 6,595,452 B1 | 7/2003 | Berthaud et al. | |
| 6,644,582 B1 | 11/2003 | Liao | |
| 7,083,497 B2 | 8/2006 | Halley et al. | |
| 7,151,912 B1 | 12/2006 | Morrison | |
| 8,123,010 B2 | 2/2012 | Skowronski et al. | |
| 8,387,763 B2 | 3/2013 | Burke et al. | |
| 2007/0096538 A1 | 5/2007 | Niemi et al. | |
| 2007/0123080 A1 | 5/2007 | Matsumoto | |
| 2012/0039610 A1 * | 2/2012 | Bradbury | H04B 10/25759 |
| | | | 398/116 |
| 2013/0284843 A1 | 10/2013 | Mertesdorf | |
| 2013/0307325 A1 | 11/2013 | Arasu | |
| 2014/0339039 A1 | 11/2014 | Ono | |

FOREIGN PATENT DOCUMENTS

| | | |
|---|---|---|
| EP | 2455319 A2 | 5/2012 |
| WO | WO-2012/115722 A1 | 8/2012 |

* cited by examiner

SYSTEM AND APPARATUS FOR ELECTRICALLY COUPLING TO A CABLE ON A ROTATABLE REEL USING OPTICAL COMMUNICATION DEVICES

CROSS-REFERENCE TO RELATED APPLICATION

The present application claims the benefit of U.S. Provisional Patent Application 61/991,445 entitled "SYSTEM AND APPARATUS FOR ELECTRICALLY COUPLING TO A CABLE ON A ROTATABLE REEL", filed on May 9, 2014 and hereby incorporated by reference herein.

FIELD OF THE INVENTION

The invention relates generally to a rotatable reel apparatus and, more particularly, to system and apparatus for electrically coupling to a cable on a rotatable reel using optical communication devices.

BACKGROUND

Factories and other industrial environments are increasingly using remote devices (ex. video cameras, sensors, control devices, etc.) for control, monitoring, or other functions in their manufacturing equipment. Among other operations, these devices may be used to monitor activities for real-time or recorded operations or to control specific processes or equipment. They may be located in a wide range of static or mobile locations in the industrial facility and may require DC (Direct Current) or AC (Alternate Current) power to function and/or an ability to receive data (ex. instructions) from a distant location and/or an ability to transmit data (ex. video content) to a distant location.

Due to the remote locations and/or movement of these devices, it is not typically convenient to plug in the devices to local power outlets. Further, due to electromagnetic interference that is typical within industrial environments, wireless communication technologies may not provide a reliable communication channel. Further, in the case that there are a large number of these remote devices, the cost for adding wireless receivers/transmitters within each device can be high.

Most industrial environments employ the use of wired solutions to power and communicate to/from the remote devices. In many cases, cables spooled on rotatable reels are used to connect to the remote devices and control the extracting and retracting of the cable, thus reducing the risk of cables getting tangled or caught within equipment. One significant issue with using cables spooled on rotatable reels is how to transfer electrical current onto the cable when the cable is connected to an element on the reel that is rotating relative to a static power source. Another significant issue is how to transfer data to/from remote devices through the cable when the cable is connected to an element on the reel that is rotating relative to a static data receiver and/or transmitter.

In one implementation, to enable transfer of electrical power, the rotatable element within the reel that is connected to one end of the cable comprises one or more copper brushes. These brushes may come into contact with a static frame of the reel as the rotatable element rotates and can provide a continuous or semi-continuous electrical connection between the static frame of the reel and the rotatable element that the cable is connected to. Electrical power can be transferred through these copper brushes from the static frame to the rotatable element and can allow for electrical power to be transferred to remote devices connected to the rotatable element via the cable. A problem with this implementation is that the copper brushes have been shown to wear down and the continuous surface-on-surface friction is a significant source of failures for a wide variety of reasons including carbon buildup causing false contact, broken brushes and generation of heat. To overcome these problems with using copper brushes to transfer electrical power to the rotatable element, in some implementations thicker copper is used or gold alloy brushes replace the copper brushes. These solutions come at a significantly increased cost and have many of the same problems since they still rely on surface-to-surface friction to transfer the electrical power. An additional problem is that brushes, although suited to transfer DC power, cause significant electromagnetic noise and interference to any data being transferred either on themselves or on nearby lines.

Another implementation of a reel is disclosed within U.S. Pat. No. 3,430,179 issued Feb. 25, 1969 and entitled "Cable Reel" by Shoji, herein incorporated by reference. In this implementation, an electrical connector for connecting a multiconductor cable on a reel with an exterior multiconductor cable comprises a rotatable inner sleeve and a stationary outer sleeve, and a one-piece, flat flexible multiconductor element (commonly known as ribbon-cable or ribbon-wire or flat flex cable) wound around the inner sleeve. The inner end of the multiconductor element terminates at a multiple terminal electrical connector secured to the inner sleeve, and the outer end of the cable terminates at a multiple terminal electrical connector secured to the outer sleeve. The inner sleeve is rotatable with the reel, and the multiconductor element unwinds from the inner sleeve as the reel revolves and the multiconductor cable on the reel is payed out. In this implementation, data can be transferred along the multiconductor element. One problem with this solution is that the multiconductor element when wound around the inner sleeve can generate self-inductance and high distributed capacitance that can limit the bandwidth of data that can be communicated through the multiconductor element.

Against this background, there is a need for solutions that will mitigate at least one of the above problems. In particular, there is a need for a cable reel that has an improved apparatus for power and/or data communication transfer to/from a cable on the reel.

SUMMARY OF THE INVENTION

The present invention is directed to cable reel apparatus which allow for improved transfer of power and/or data between a static frame and a cable wound around a rotatable element. The cable reel may comprise one or more torsional springs that are used to store mechanical energy that can be used to retract the cable onto the rotatable element and can also be used to electrically couple the cable wound on the rotatable element to a static node within the static frame. The cable reel may also comprise a data transfer apparatus that enables the transfer of data between a static node within the frame of the cable reel and the cable. In one implementation, the data transfer apparatus comprises two capacitive plates that together form a capacitor, one connected to the static frame and one connected to the rotatable element. In another implementation, the data transfer apparatus comprises an optically isolated zone in which an optical transmitter may communicate data to an optical receiver over free-space optical communications. The data in these implementations can be transferred through the data transfer apparatus without physical contact between the static frame and the rotatable element, even while the rotatable element may rotate relative to the static frame.

According to a first broad aspect, the present invention is an apparatus comprising: a frame having an axle; a rotatable element operable to rotate on the axle and having an outer surface surrounding the axle adapted to have a cable wrapped; and a torsional spring having windings surrounding the axle with a first end coupled to the axle and a second end coupled to the rotatable element. The torsional spring is conductive and operable to electrically connect a first node in the frame to a second node in the rotatable element. In embodiments of the present invention, the axle can comprise a cylindrical tube and a non-cylindrical shaft integrated within the cylindrical tube. The rotatable element may be adapted to rotate around the cylindrical tube of the axle and the first end of the torsional spring may be connected to the non-cylindrical shaft. In this case, the first end of the torsional spring is connected to the frame and is not operable to rotate with the rotatable element. The first node can be connected to a wire element that is routed through the non-cylindrical shaft to the first end of the torsional spring. The second node can be adapted to be connected to a cable wrapped around the outer surface of the rotatable element. The frame may comprise an interface connector that is adapted to connect to a cable external to the apparatus and to electrically connect the cable external to the cable to the first node and the rotatable element may comprise an interface connector that is adapted to connect to a cable wrapped around the outer surface of the rotatable element and to electrically connect the cable wrapped around the outer surface of the rotatable element to the second node. The torsional spring can be adapted to contract in response to rotation of the rotatable element in a first direction and to cause rotation of the rotatable element in a second direction opposite the first direction if the torsional spring is enabled to expand. Effectively, the torsional spring can be adapted to store mechanical energy in response to rotation of the rotatable element in a first direction and to cause rotation of the rotatable element in a second direction opposite the first direction when releasing the stored mechanical energy.

In some embodiments, the apparatus may comprise a plurality of electrically isolated torsional springs, each of the torsional springs having windings surrounding the axle with first ends coupled to the axle and second ends coupled to the rotatable element. In this case, each of the torsional springs can be conductive and operable to electrically connect respective first nodes in the frame to respective second nodes in the rotatable element. The plurality of torsional springs can each be electrically isolated by insulation elements, the first ends of the torsional springs can be electrically isolated at the axle, and the second ends of the torsional springs can be electrically isolated at the rotatable element. The second nodes in the rotatable elements can be adapted to be electrically connected to a cable wrapped around the outer surface of the rotatable element, each of the second nodes being electrically connected to a different conductive element within the cable.

In a specific implementation, the plurality of torsional springs may comprise first and second torsional springs and the cable wrapped around the outer surface of the rotatable element may comprise a coaxial cable. The second end of the first torsional spring can be adapted to be electrically connected to a central core of the coaxial cable and the second end of the second torsional spring can be adapted to be electrically connected to a metallic shielding of the coaxial cable. At least one of the torsional springs can be adapted to electrically connect a positive DC voltage from the frame to a first conductive element within the cable wrapped around the outer surface of the rotatable element and at least one other of the torsional springs can be adapted to electrically connect a negative DC voltage from the frame to a second conductive element within the cable wrapped around the outer surface of the rotatable element. The cable wrapped around the outer surface of the rotatable element may comprise a coaxial cable and the apparatus may further comprise a DC coupling circuit that is adapted to connect one of the positive and negative DC voltages to a central core of the coaxial cable and the other of the positive and negative DC voltages to a metallic shielding of the coaxial cable. In one implementation, at least one of the torsional springs can be adapted to electrically connect a grounded voltage from the frame to a conductive element within the cable wrapped around the outer surface of the rotatable element.

In some particular implementations, the apparatus may comprise an internal cable having windings surrounding the axle with a first end coupled to the axle and a second end coupled to the rotatable element. The cable can be operable to electrically connect respective one or more nodes in the frame to one or more nodes in the rotatable element. The internal cable may comprise at least one of a flat cable, a ribbon cable and a flat flex cable. The torsional spring may be adapted to electrically connect a DC voltage from the frame to a first conductive element within the cable wrapped around the outer surface of the rotatable element and the internal cable may be adapted to electrically connect a negative DC voltage from the frame to a second conductive element within the cable wrapped around the outer surface of the rotatable element.

In some embodiments, the apparatus of the first broad aspect may further comprise a first capacitive plate integrated with the frame and a second capacitive plate integrated with the rotatable element. The first and second capacitive plates can form a capacitor operable to pass data signals between the frame and the rotatable element. The first node can be electrically coupled to the first capacitive plate and the second node can be electrically coupled to the second capacitive plate. The frame may comprise a first isolation circuit adapted to prevent data at the first node from being transmitted to the first end of the torsional spring and the rotatable element may comprise a second isolation circuit adapted to prevent data at the second node from being transmitted to the second end of the torsional spring. The first isolation circuit can be adapted to prevent a DC voltage at the first node from being electrically connected to the first capacitive plate and the second isolation circuit can be adapted to prevent a DC voltage at the second node from being electrically connected to the second capacitive plate.

In some embodiments, the frame may comprise a first optical communication element and the rotatable element may comprise a second optical communication element, the first and second optical communication elements being adapted to optically communicate with each other during rotation of the rotatable element relative to the frame. The first optical communication element may comprise an optical receiver and the second optical communication element may comprise an optical transmitter operable to communicate data signals from the rotatable element to the frame using free-space optical communications. The second optical communication element may comprise an optical receiver and the first optical communication element may comprise an optical transmitter operable to communicate data signals from the frame to the rotatable element using free-space optical communications. The first node can be electrically coupled to the first optical communication element and the second node can be electrically coupled to the second optical communication element. The frame may comprise a first isolation circuit adapted to prevent data at the first node from being transmitted to the first end of the torsional spring and the rotatable element may comprise a second isolation circuit adapted to prevent data at the second node from being transmitted to the second end of the torsional spring.

According to a second broad aspect, the present invention is a system comprising the apparatus of the first broad aspect including the first and second capacitive plates and a first conversion element electrically connected to the first capacitive plate and operable to convert data between first and second formats. The first conversion element is operable to communicate data with a component external to the apparatus in the first format and to communicate data over the capacitor formed by the first and second capacitive plates in the second format. The system may further comprise a second conversion element electrically connected to the second capacitive plate and operable to convert data between the first and second formats. The second conversion element can be operable to communicate data with a component external to the apparatus in the second format and communicate data with the first conversion element in the second format via the capacitor formed by the first and second capacitive plates. The first format may be Ethernet and the second format may be a high frequency analog format, though other formats could be utilized. The first conversion element may be integrated within the frame of the apparatus and the second conversion element may be integrated within the rotatable element of the apparatus. The first conversion element may be operable to receive power from a component external to the apparatus and to couple a DC voltage to the first node in the frame and the second conversion element may be operable to receive power at least in part from the second node in the rotatable element. The second conversion element may be operable to transmit power to a component external to the apparatus.

According to a third broad aspect, the present invention is an apparatus comprising: a frame having an axle; a rotatable element operable to rotate on the axle and having an outer surface surrounding the axle adapted to have a cable wrapped; means for electrically connecting a first node in the frame to a second node in the rotatable element; and means for communicating data between the frame and the rotatable element independent of the means for electrically connecting the first and second nodes. The means for electrically connecting the first and second nodes may comprise at least one torsional spring connected between the frame and the rotatable element. The means for communicating data may comprise a first capacitive plate integrated with the frame and a second capacitive plate integrated with the rotatable element. The first and second capacitive plates can form a capacitor operable to pass data signals between the frame and the rotatable element. Alternatively, the means for communicating data may comprise a first optical communication device integrated with the frame and a second optical communication device integrated with the rotatable element, the first and second optical communication devices being adapted to optically communicate with each other during rotation of the rotatable element relative to the frame.

According to a fourth broad aspect, the present invention is an apparatus comprising: a frame comprising an axle; a rotatable element operable to rotate on the axle; and first and second capacitive plates. The first capacitive plate is integrated with the frame and the second capacitive plate is integrated with the rotatable element. The first and second capacitive plates form a capacitor operable to pass data signals between the frame and the rotatable element. The rotatable element may have an outer surface surrounding the axle adapted to have a cable wrapped, the second capacitive plate being adapted to be coupled to the cable. The first and second capacitive plates may each be centered on the axle such that the first and second capacitive plates are aligned to form the capacitor during rotation of the rotatable element on the axle. Each of the capacitive plates can be circular such that the capacitance of the capacitor formed by the first and second capacitive plates remains substantially consistent during rotation of the rotatable element on the axle relative to the frame. Further, the capacitive plates may each comprise a central capacitive surface and an annular capacitive surface that surrounds the central capacitive surface, the central capacitive surface and the annular capacitive surface being electrically isolated. In this case, the central capacitive surfaces of the first and second capacitive plates can form a first capacitor and the annular capacitive surfaces of the first and second capacitive plates can form a second capacitor. In one implementation, the central capacitive surface and the annular capacitive surface of the first capacitive plate can be electrically connected to a central core and a metallic shielding respectively of a first coaxial cable; and the central capacitive surface and the annular capacitive surface of the second capacitive plate can be electrically connected to a central core and a metallic shielding respectively of a second coaxial cable. In this case, data transmitted between a component electrically connected to the first coaxial cable and a component electrically connected to the second coaxial cable can be communicated via the central cores of the first and second coaxial cable and across the first capacitor formed from the central capacitive surfaces of the first and second capacitive plates. In some cases, other cables with alternative physical interfaces may be utilized.

In some embodiments, the apparatus of the fourth broad aspect may comprise an electrical connection element adapted to electrically connect a first node in the frame to a second node in the rotatable element independent of the capacitor formed by the first and second capacitive plates. The electrical connection element may comprise a torsional spring having windings surrounding the axle with a first end coupled to the axle and a second end coupled to the rotatable element. The torsional spring can be conductive and operable to electrically connect the first node in the frame to the second node in the rotatable element. The first node can be electrically coupled to the first capacitive plate and the second node can be electrically coupled to the second capacitive plate. In this case, the frame may comprise a first isolation circuit adapted to prevent data at the first node from being transmitted to the first end of the torsional spring and the rotatable element may comprise a second isolation circuit adapted to prevent data at the second node from being transmitted to the second end of the torsional spring. The first isolation circuit can be adapted to prevent a DC voltage at the first node from being electrically connected to the first capacitive plate and the second isolation circuit can be adapted to prevent a DC voltage at the second node from being electrically connected to the second capacitive plate.

According to a fifth broad aspect, the present invention is a system comprising the apparatus of the fourth broad aspect and a first conversion element electrically connected to the first capacitive plate and operable to convert data between first and second formats. The first conversion element can be operable to communicate data with a component external to the apparatus in the first format and to communicate data over the capacitor formed by the first and second capacitive plates in the second format. The system may further comprise a second conversion element electrically connected to the second capacitive plate and operable to convert data between the first and second formats. The second conversion element can be operable to communicate data with a component external to the apparatus in the second format and communicate data with the first conversion element in the second format via the capacitor formed by the first and second capacitive plates. The first format may be Ethernet and the second format may be a high frequency analog format, though other formats could be utilized. The first conversion element may be integrated within the frame of the apparatus and the second conversion element may be integrated within the rotatable element of the apparatus. The first conversion element may be operable to receive power from a component external to the apparatus and to couple a DC voltage to a first node in the frame and the second conversion element may be operable to receive power at least in part from a second node in the rotatable element. The apparatus may further comprise an electrical connection element for electrically connecting the first and second nodes independent of the capacitor formed by the first and second capacitive plates. In some implementations, the electrical connection element may comprise a torsional spring having windings surrounding the axle with a first end coupled to the axle and a second end coupled to the rotatable element. The torsional spring can be conductive and operable to electrically connect the first node in the frame to the second node in the rotatable element. The second conversion element may be operable to transmit power to a component external to the apparatus.

According to a sixth broad aspect, the present invention is a data transfer apparatus adapted to be integrated within a cable reel comprising a frame comprising an axle and a rotatable element operable to rotate on the axle and having an outer surface surrounding the axle adapted to have a cable wrapped. The data transfer apparatus comprises: a first capacitive plate integrated with the frame; and a second capacitive plate integrated with the rotatable element. The first and second capacitive plates form a capacitor operable to pass data signals between the frame and the rotatable element. Each of the first and second capacitive plates may be circular such that the capacitance of the capacitor formed by the first and second capacitive plates remains substantially consistent during rotation of the first and second capacitive plates relative to each other. The capacitive plates may each comprise a central capacitive surface and an annular capacitive surface that surrounds the central capacitive surface, the central capacitive surface and the annular capacitive surface being electrically isolated. The central capacitive surfaces of the capacitive plates can form a first capacitor and the annular capacitive surfaces of the capacitive plates can form a second capacitor. The central capacitive surface and the annular capacitive surface of the first capacitive plate can be adapted to be electrically connected to a central core and a metallic shielding respectively of a first coaxial cable; and the central capacitive surface and the annular capacitive surface of the second capacitive plate can be adapted to be electrically connected to a central core and a metallic shielding respectively of a second coaxial cable. In some cases, other cables with alternative physical interfaces may be utilized.

According to a seventh broad aspect, the present invention is an apparatus comprising: a frame comprising an axle and a first optical communication device; and a rotatable element operable to rotate on the axle and comprising a second optical communication device. The first and second optical communication devices are adapted to optically communicate with each other during rotation of the rotatable element relative to the frame. The rotatable element may have an outer surface surrounding the axle adapted to have a cable wrapped, the second optical communication device being adapted to be coupled to the cable. The first and second optical communication devices can be located within an optically isolated zone formed by the frame and the rotatable element and the optically isolated zone can be maintained by the frame and the rotatable element during rotation of the rotatable element relative to the frame. In some implementations, the optically isolated zone can be formed by a wall surrounding the first and second optical communication devices, the wall being coupled to one of the frame and the rotatable element. The wall surrounding the first and second optical communication devices may be cylindrical and centered on the axle. In one case, the frame may comprise a first cylindrical wall surrounding the first optical communication device and the rotatable element may comprise a second cylindrical wall surrounding the second optical communication device, the first and second cylindrical walls together forming the optically isolated zone.

In some embodiments, the first optical communication device can comprise an optical receiver and the second optical communication device can comprise an optical transmitter operable to communicate data from the rotatable element to the optical receiver of the frame using free-space optical communications within the optically isolated zone. In other embodiments, the second optical communication device can comprise an optical receiver and the first optical communication device can comprise an optical transmitter operable to communicate data from the frame to the optical receiver of the rotatable element using free-space optical communications within the optically isolated zone. In yet other implementations, both the first and second optical communication devices comprise an optical receiver and an optical transmitter. In this case, the optical transmitter of the first optical communication device is operable to communicate data from the frame to the optical receiver of the second optical communication device of the rotatable element using free-space optical communications within the optically isolated zone and the optical transmitter of the second optical communication device is operable to communicate data from the rotatable element to the optical receiver of the first optical communication device of the frame using free-space optical communications within the optically isolated zone.

In some implementations, the frame may comprise a plurality of first optical communication devices, each of the first optical communication devices comprising an optical receiver. In this case, the second optical communication device may comprise an optical transmitter operable to communicate data from the rotatable element to the optical receivers of the frame using free-space optical communications within the optically isolated zone. Similarly, in some implementations, the rotatable element may comprise a plurality of second optical communication devices, each of the second optical communication devices comprising an optical receiver, and the first optical communication device may comprise an optical transmitter operable to communicate data from the rotatable element to the optical receivers of the rotatable element using free-space optical communications within the optically isolated zone. In these cases, the plurality of optical receivers can provide a plurality of locations for reception of optical communications from the optical transmitter. In some implementations, the second optical communication device may comprises an optical receiver and the frame may comprise a plurality of first optical communication devices, each of the first optical communication devices comprising an optical transmitter operable to communicate data from the frame to the optical receiver of the rotatable element using free-space optical communications within the optically isolated zone. Similarly, the first optical communication device may comprise an optical receiver and the rotatable element may comprise a plurality of second optical communication devices, each of the second optical communication devices comprising an optical transmitter operable to communicate data from the rotatable element to the optical receiver of the frame using free-space optical communications within the optically isolated zone. In these cases, the plurality of optical transmitters can provide a plurality of locations for transmission of optical communications to the optical receiver.

In some embodiments, the frame may comprise a plurality of first optical communication devices and the rotatable element may comprise a plurality of second optical communication devices, at least one first optical communication device being paired with at least one second optical communication device for optically communicating with each other. In this case, each pair of first and second optical communication devices can be located within a separate optically isolated zone of a plurality of optically isolated zones formed by the frame and the rotatable element. Each of the optically isolated zones can be maintained by the frame and the rotatable element during rotation of the rotatable element relative to the frame. In some cases, the plurality of optically isolated zones may be formed by a plurality of cylindrical walls of different diameters centered on the axle and coupled to one of the frame and the rotatable element. The plurality of cylindrical walls can form a central circular optically isolated zone and one or more annular optically isolated zones surrounding the central optically isolated zone. Each of the pairs of first and second optical communication devices can be operable to communicate data to each other independently.

In some implementations, at least one of the optical communication devices may comprise an optical transmitter comprising an amplifier operable to amplify an input signal and a plurality of light emitting diode circuits operable to adjust intensity in response to the amplified input signal. In some implementations, at least one of the optical communication devices may comprise an optical receiver a phototransistor circuit operable to output a voltage and a plurality of amplifiers operable to output an amplified version of the voltage.

In some embodiments, the apparatus of the seventh broad aspect may comprise an electrical connection element adapted to electrically connect a first node in the frame to a second node in the rotatable element independent of the optical communication between the first and second optical communication devices. The electrical connection element may comprise a torsional spring having windings surrounding the axle with a first end coupled to the axle and a second end coupled to the rotatable element. The torsional spring can be conductive and operable to electrically connect the first node in the frame to the second node in the rotatable element. The first node can be electrically coupled to the first optical communication device and the second node can be electrically coupled to the second optical communication device. In this case, the frame may comprise a first isolation circuit adapted to prevent data at the first node from being transmitted to the first end of the torsional spring and the rotatable element may comprise a second isolation circuit adapted to prevent data at the second node from being transmitted to the second end of the torsional spring.

According to an eighth aspect, the present invention is a data transfer apparatus adapted to be integrated within a cable reel comprising a frame comprising an axle and a rotatable element operable to rotate on the axle and having an outer surface surrounding the axle adapted to have a cable wrapped. The data transfer apparatus comprises: a first optical communication device adapted to be integrated with the frame; and a second optical communication device adapted to be integrated with the rotatable element. The first and second optical communication devices are adapted to optically communicate with each other during relative rotation to each other. The first and second optical communication devices can be located within an optically isolated zone and the optically isolated zone can be maintained during rotation of the rotatable element relative to the frame. In some embodiments, the optically isolated zone may be formed by a wall surrounding the first and second optical communication devices. The wall surrounding the first and second optical communication devices may be cylindrical and adapted to be centered on the axle. In some implementations, the apparatus comprises a plurality of first optical communication devices adapted to be integrated with the frame and a plurality of second optical communication devices adapted to be integrated with the rotatable element. In this case, at least one first optical communication device is paired with at least one second optical communication device for optically communicating with each other. Each pair of first and second optical communication devices can be located within a separate optically isolated zone of a plurality of optically isolated zones. The plurality of optically isolated zones may be formed by a plurality of cylindrical walls of different diameters adapted to be centered on the axle. The plurality of cylindrical walls can form a central circular optically isolated zone and one or more annular optically isolated zones surrounding the central optically isolated zone.

These and other aspects of the invention will become apparent to those of ordinary skill in the art upon review of the following description of certain embodiments of the invention in conjunction with the accompanying drawings.

BRIEF DESCRIPTION OF THE DRAWINGS

A detailed description of embodiments of the invention is provided herein below, by way of example only, with reference to the accompanying drawings, in which.

Figure 1A:
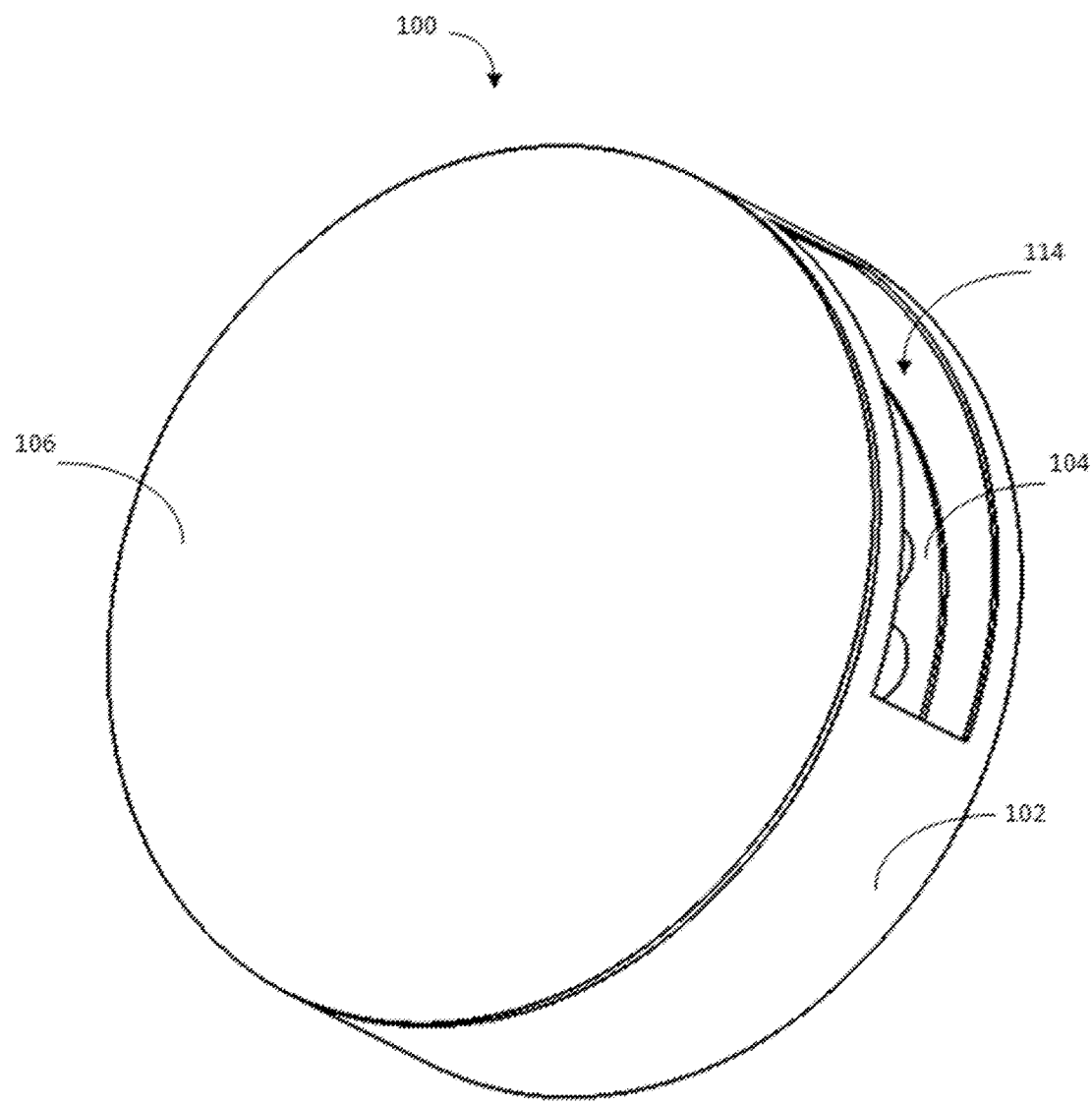
FIGS. 1A and 1B are a perspective view and a breakout view respectively of a cable reel according to one embodiment of the present invention.

It is to be expressly understood that the description and drawings are only for the purpose of illustration of certain embodiments of the invention and are an aid for understanding. They are not intended to be a definition of the limits of the invention.

DETAILED DESCRIPTION OF EMBODIMENTS

The present invention is directed to cable reel designs which allow for improved transfer of power and/or data between a static frame of the reel and a cable wound around a rotatable element of the reel. In embodiments of the present invention, data can be transferred to/from the cable without physical contact between the static frame and the rotatable element around which the cable is wound and power can be transferred to the cable using mechanical components such as one or more torsional springs. This lack of physical contact in the data transfer and the use of mechanical components such as torsional springs in the power transfer can improve reliability of the cable reel, reduce the generation of heat within the reel due to friction, increase the lifespan of the cable reel and/or reduce electromagnetic noise that is generated by brushes.

In some embodiments of the present invention, the cable reel comprises a torsional spring that is used to store mechanical energy that can be used to retract the cable onto the rotatable element. The torsional spring can be conductive and also be used to electrically couple the cable wound on the rotatable element to a static node within the static frame. In some cases, there may be a plurality of electrically isolated torsional springs that are used to electrically couple the cable to a plurality of static nodes. For example, two electrically isolated torsional springs may be incorporated within the cable reel to electrically couple a positive DC voltage and a negative DC voltage to the cable. In another example, three electrically isolated torsional springs may be incorporated within the cable reel to electrically couple a positive DC voltage, a negative DC voltage (possibly a reference ground) and an earth ground to the cable. It should be understood that other embodiments may also be implemented that use one or a plurality of electrically isolated torsional springs.

In some embodiments of the present invention, the cable reel comprises a data transfer apparatus that enables the transfer of data between a static node within the frame of the cable reel and a cable wrapped around the rotatable element of the cable reel. In one implementation, the data transfer apparatus comprises a capacitance coupling apparatus that contains two capacitive plates that together form a capacitor, one connected to the static frame and one connected to the rotatable element. The data can be transferred through the capacitance coupling apparatus without physical contact between the two capacitive plates, hence without physical contact between the static frame and the rotatable element, even when the capacitive plates rotate relative to each other.

In another implementation, the data transfer apparatus comprises a free-space optical communication apparatus that contains an optically isolated zone in which an optical transmitter may communicate data to an optical receiver. The optical transmitter/receiver system may be used to communicate data from the rotatable element to the static frame and/or may be used to communicate data from the static frame to the rotatable element without physical contact between the static frame and the rotatable element. In some implementations, the free-space optical communication apparatus may comprise a plurality of optically isolated zones that maintain alignment between optical transmitters/receivers when the rotatable element rotates relative to the static frame. In this case, each optically isolated zone can be used to communicate a separate data channel, thus enabling independent two way communications without time multiplexing and/or increased bandwidth of data to be communicated by using a plurality of parallel data channels.

Figure 1B:
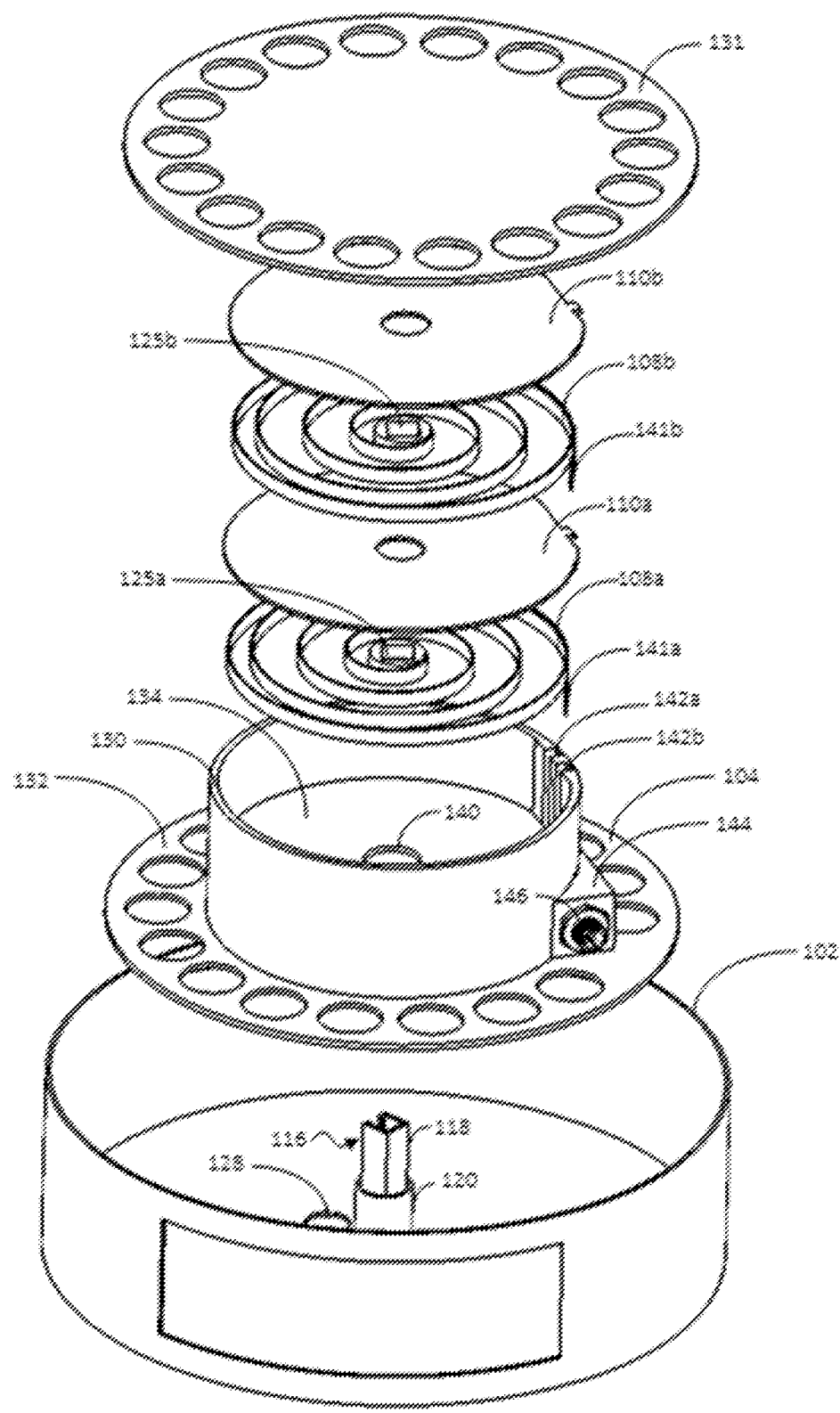

FIGS. 1A and 1B are a perspective view and a breakout view respectively of a cable reel 100 according to one embodiment of the present invention. The cable reel 100 comprises a frame 102 forming a cylindrical encasement and a rotatable element 104 integrated within the frame 102. The frame 102 is a static element that may be mounted to equipment, walls or other fixed elements. The rotatable element 104, as will be described in more detail, is operable to rotate within the frame 102 and may have a cable wrapped around it. As shown in FIG. 1A, the cable reel 100 further comprises a circular cover 106 that may be a portion of the frame 102 or may be a removable component that allows for access to the elements within the frame 102. In FIG. 1B, the cover 106 has been removed for simplicity and the elements within the cable reel 100 in one implementation are illustrated in a breakout view. As shown in FIG. 1B, the rotatable element 104 may further have a corresponding rotatable element cover 131 which when integrated with the rotatable element 104 is adapted to provide a circular area on the exterior capable of having a cable wrapped. Although shown as cylindrical, the frame 102 may be another shape that allows for the rotatable element 104 to rotate within it.

As shown in FIG. 1B, the cable reel 100 may further comprise first and second torsional springs 108a, 108b within the rotatable element 104 with a separator 110a between the torsional springs 108a, 108b and a separator 110b on top of the second torsional spring 108b. In these embodiments, the torsional springs 108a, 108b comprise a plurality of circular windings and are composed of a conductive material such as metal that may conduct a voltage from one end of the spring to the other end. In one specific implementation, the torsional springs 108a, 108b are composed of aluminum, though other conductive materials could be used. As shown in FIG. 1B, the torsional springs 108a, 108b each have a respective inner end 125a, 125b adapted to enable insertion of a square element. Further, in the specific implementation of FIG. 1B, the torsional springs 108a, 108b comprise respective perpendicular jutting element 141a, 141b on or local to the outer end of the torsional springs. The jutting element 141a, 141b may be used to insert within slots 142a, 142b within the rotatable element as will be described. In other embodiments, alternative techniques may be used to adapt the outer ends of the torsional springs to couple to the rotatable element 104.

The separators 110a, 110b are used to electrically isolate the torsional springs 108a, 108b and are composed of a non-conductive material. In one specific implementation, the separators 110a, 110b may be composed of plastic, though other materials could be used. In some embodiments, there may be a further separator between the first torsional spring 108a and the rotatable element 104. This would be the case if the rotatable element 104 is composed of a conductive material such as metal but a further separator may be used even if the rotatable element 104 is composed of a non-conductive material. Along with providing electrical isolation, the separators 110a, 110b also provide mechanical separation.

It should be understood that the cable reel 100 of FIG. 1B is only one implementation of the present invention. In other embodiments, the cable reel 100 may only comprise a single torsional spring. In other embodiments, the cable reel 100 may comprise more than two torsional springs. In each case, a separator would be implemented to electrically isolate the torsional springs if independent voltages are desired to be conducted on the torsional springs.

Figure 2A:
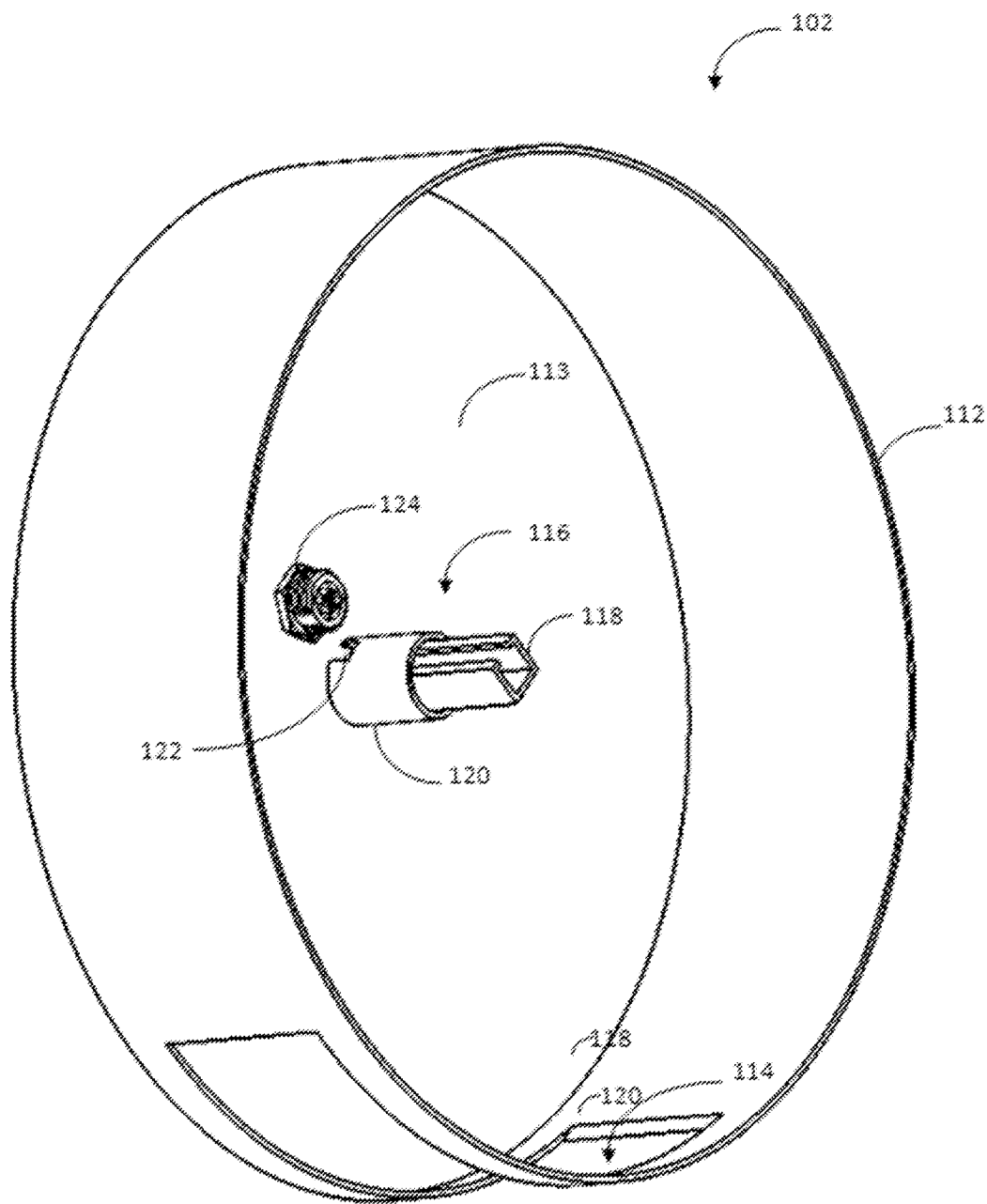
FIG. 2A is a perspective view of a frame of the cable reel of FIGS. 1A and 1B.

FIG. 2A is a perspective view of the frame 102 of the cable reel 100 according to one embodiment of the present invention. The frame 102 comprises an open ended cylindrical element 112 having walls perpendicular to a circular end plate 113. The cylindrical element has a slot 114 within its walls to allow a cable to go through from the interior of the frame 102 to the exterior. The frame 102 further comprises an axle 116 perpendicularly connected to the circular end plate 113 of the cylindrical element 112. As shown in FIG. 2A, the axle 116 is centered within the cylindrical element 112. If the cylindrical element 112 was significantly larger than the rotatable element 104 that is operable to rotate within the frame 102, then the axle 116 may not be centered in some embodiments.

The axle 116 comprises a slotted shaft 118 that is surrounded by a circular tube 120. The slotted shaft 118 comprises a square hollow tube with a slot that extends the length of one side of the tube. The slotted shaft 118 extends beyond the circular tube 120. The circular tube 120 comprises at least one slot 122 that is aligned with the slot of the slotted shaft 118. The circular tube 120 provides a surface for the rotatable element 104 to rotate around. In some implementations, a ball bearing may also be added to ease rotation. The slotted shaft 118 allows wires to traverse the axle 116 between the slot 122 in the circular tube 120 and the portion of the slotted shaft 118 that extends past the circular tube 120. The slotted shaft 118 also provides a fixed point around which elements cannot rotate. As shown in FIG. 1B, the inner ends 125a, 125b of the torsional springs 108a, 108b are shaped to fit around the portion of the slotted shaft 118 that extends beyond the circular tube 120. This ensures that the inner ends 125a, 125b of the torsional springs 108a, 108b are physically connected to the frame 102 and will not rotate with the rotatable element 104. When coupling to the slotted shaft 118, it should be understood that the torsional springs 108a, 108b (if there are a plurality of electrically isolated torsional springs) should be kept electrically isolated at the slotted shaft 118 and the slotted shaft 118 may comprise a non-conductive material or be coated with a non-conductive coating. The separators 110a, 110b may sufficiently electrically isolate the torsional springs 108a, 108b at the slotted shaft 118 or further isolation elements may be used.

In alternative embodiments, the slotted shaft 118 may be other shapes than square, such as triangular, pentagonal, etc. The shape of the slotted shaft 118 in this implementation allows elements such as ends of the torsional springs to connect and not rotate with the rotatable element 104 while it rotates around the circular tube 120. In an alternative embodiment, a plurality of slotted shafts may be implemented that are of different dimensions, each one decreasing in size inside the previous. In this case, if kept electrically isolated, the slotted shafts themselves could each be electrically conductive and be electrically coupled to a respective torsional spring. Thus the voltages transferred between the frame 102 and the rotatable element 104 could be transferred via a nested set of slotted shafts to a plurality of torsional springs.

In some embodiments of the present invention, the frame 102 further comprises a connector 124 integrated within a hole 128. This connector 124 can be used as the electrical connection to the interface to the cable reel 100. As will be described, power and/or data may be transferred via the connector 124. A local cable may be connected to the connector 124 and extend inside the frame 102 to connect to other elements as will be described herein. In one case, the cable or one or more cables output from another element within the frame 102 could be routed through the slot 122 within the circular tube 120 and through the slotted shaft 118. The cable connected to the connector 124 would be connected to the frame 102 and therefore would be static and not rotate with the rotatable element 104. In alternative embodiments, the connector 124 may be removed and a local cable may extend through the hole 128 with no connector. The advantage of including the connector 124 is that it may keep the interior of the frame 102 environmentally isolated from the exterior of the frame 102, hence reducing dust, dirt, water and other environmental elements from entering the cable reel 100 through the hole 128. In some embodiments, the connector 124 may be implemented but the frame 102 may not be environmentally isolated from the exterior of the frame 102.

Figure 2B:
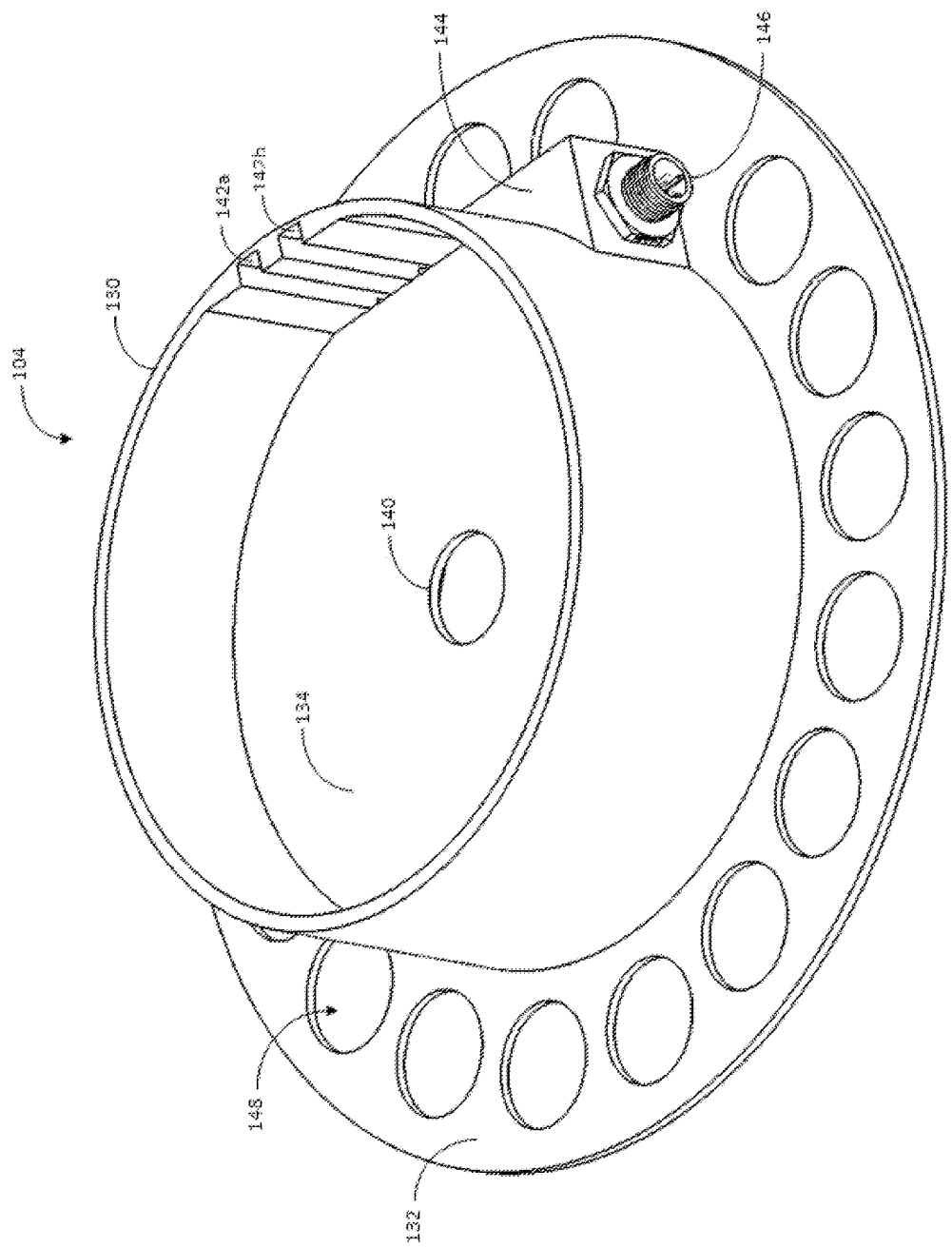
FIGS. 2B and 2C are top and bottom perspective views respectively of a rotatable element of the cable reel of FIGS. 1A and 1B.
Figure 2C:
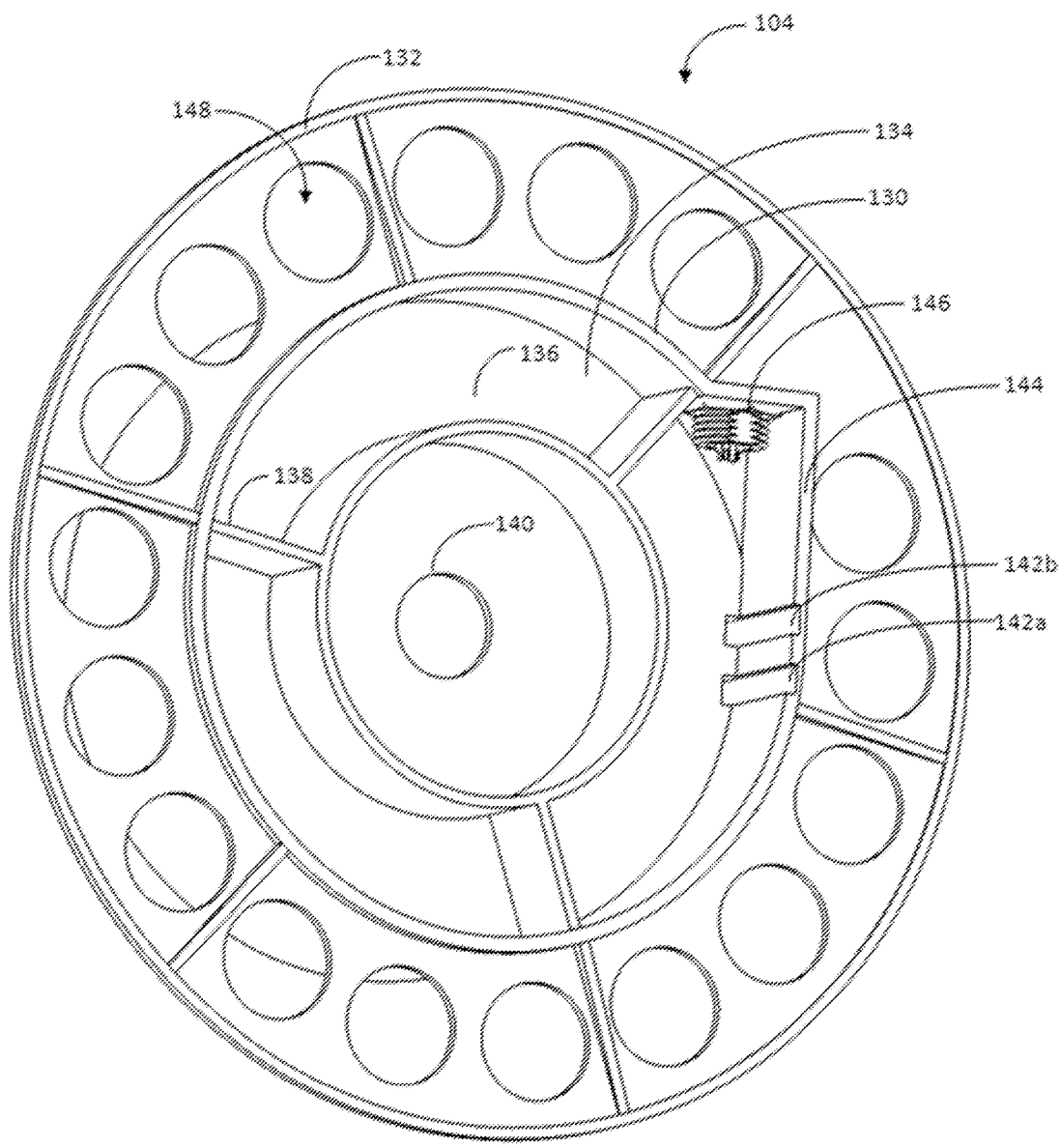

FIGS. 2B and 2C are top and bottom perspective views respectively of the rotatable element 104 of the cable reel 100 according to one embodiment of the present invention. As shown, the rotatable element 104 comprises an open ended cylindrical element 130 connected perpendicularly to a circular ring plate 132 that has an inner diameter equal to the diameter of the cylindrical element 130 and an outer diameter larger than the diameter of the cylindrical element 130. In operation, a cable may be wrapped around the exterior of the cylindrical element 130 and the circular ring plate 132 along with the rotatable element cover 131 can be used as guide elements and prevent the cable from sliding off the circular element 130. As shown, the rotatable element 104 further comprises a circular plate 134 perpendicularly connected to the inner surface of the cylindrical element 130, the circular plate 134 dividing the interior of the cylindrical element 130 into an upper and lower cavity area within the cylindrical element 130. The circular plate 134 has a circular hole 140 in the center that is of sufficient size to allow for the circular tube 120 of the axle 116 to traverse and allow for the rotatable element 104 to rotate around the axle 116.

In the implementation of FIG. 2C, the rotatable element 104 further comprises an inner cylindrical element 136 with a diameter less than the diameter of the cylindrical element 130 (herein also referred to as the outer cylindrical element). The inner cylindrical element 136 is perpendicularly connected to the lower side of the circular plate 134 and is connected to the outer cylindrical element 130 with use of a plurality of struts 138, in this case three struts equally distant around the circumference of the inner cylindrical element 136. The inner cylindrical element 136 and the struts 138 provide mechanical support to the outer cylindrical element 130, making the component stronger and more resistant to external forces that may be applied during operation. Further, the inner cylindrical element 136 and struts 138 create a plurality of compartments on the lower cavity area of the outer cylindrical element 130 that may be used for electrical components or cables/wires if necessary. It should be understood that in some embodiments, there may be holes through the inner cylindrical element 136 and/or the struts 138 to pass wires or cables needed for operation of the cable reel 100. Further, it should be understood that other mechanical structures could be used to provide support to the outer cylindrical element 130 and, in some cases, the inner cylindrical element 136 and the struts 138 are removed altogether.

As shown, in some embodiments of the present invention, the cylindrical element 130 further comprises one or more grooves 142a, 142b that run the length of the interior of the element. Each of the grooves 142a, 142b is adapted to connect to a respective one of the jutted elements 141a, 141b at the outer end of a respective one of the torsional springs 108a, 108b. By connecting to the respective groove 142a, 142b, the outer ends of the torsional springs 108a, 108b are connected to the rotatable element 104 while the inner ends 124a, 124b of the torsional springs 108a, 108b are connected to the frame 102 by the slotted shaft 118. In FIG. 2B, the cylindrical element 130 has two grooves 142a, 142b which is consistent with the two torsional springs 108a, 108b of FIG. 1B, though it should be understood that there may be other numbers of grooves in other embodiments or alternative techniques for coupling the outer ends of the torsional springs to the rotatable element 104.

In the architecture of FIG. 1B, the torsional springs 108a, 108b will contract when the rotatable element 104 rotates in the same direction as the windings on the torsional springs 108a, 108b, thus storing mechanical energy. This mechanical energy can be stored using a locking mechanism (not shown) on the rotatable element 104. Once the force that is causing the rotation in the rotatable element 104 is no longer present and any locking function that may have been applied is released, the torsional springs 108a, 108b will attempt to rebound and expand, causing the rotatable element 104 to rotate in the opposite direction to the windings of the torsional springs 108a, 108b.

In some embodiments of the present invention, the cylindrical element 130 further comprises a cable interface element 144 which protrudes on the exterior of the element. The cable interface element 144 comprises a connector 146 that can allow a cable that is to be wrapped around the cylindrical element 130 to be connected. The cable can then be connected to electrical components and/or cable/wiring within the interior of the cylindrical element 130. In some embodiments of the present invention, other mechanical designs could be applied to allow a cable wrapped around the cylindrical element 130 to be connected to electrical components within the rotatable element 104 or to the outer ends of one or more of the torsional springs 108a, 108b. For instance, the connector 146 may not be implemented in some embodiments and a cable wrapped around the cylindrical element 130 could be directly electrically connected to a component within the rotatable element 104 or to the outer ends of one or more of the torsional springs 108a, 108b.

In the implementation of FIGS. 2B and 2C, the circular ring plate 132 further comprises a plurality of holes 148 around the ring surrounding the cylindrical element 130. These holes 148 allow for the cable reel 100 to be reduced in weight in the case that the rotatable element 104 is composed of a material that is relatively heavy. It should be understand that these holes 148 may be removed in some implementations. Further, there may be other holes in the circular plate 134 and/or the outer cylindrical element 130 and/or the rotatable element cover 131. The holes in the circular plate 134 and/or the cylindrical element 130 and/or rotatable element cover 131 could be used to route required internal wiring (ex. an internal cable to connect components within the cable reel 100) or could be used to simply reduce weight similar to the holes 148.

Figure 3A:
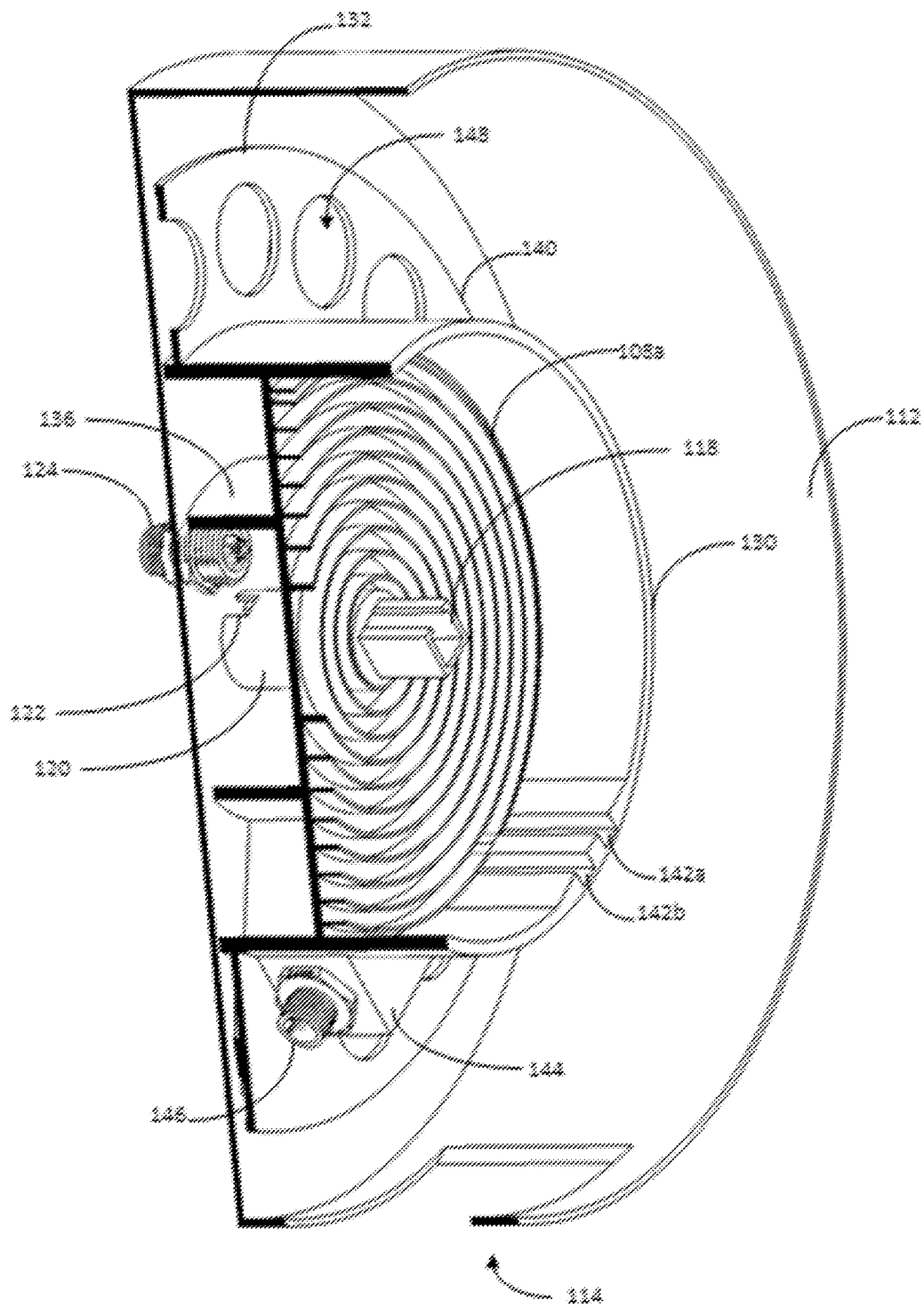
FIG. 3A is a cross-sectional view of the cable reel of FIGS. 1A and 1B illustrating elements used to electrically connect nodes according to one implementation.
Figure 3B:
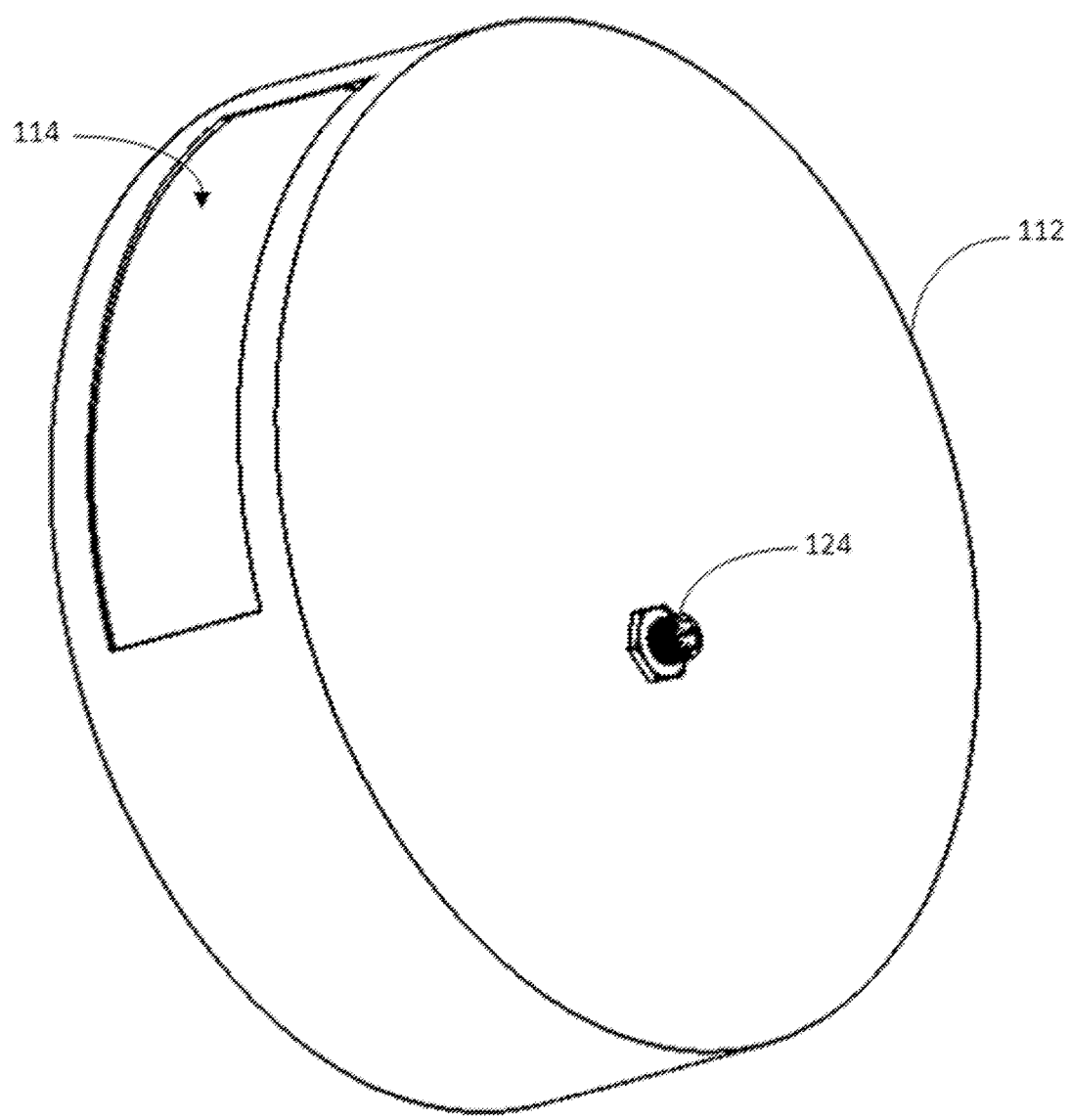
FIG. 3B is a rear view of the cable reel of FIGS. 1A and 1B.

FIG. 3A is a cross-sectional view of the cable reel 100 illustrating elements used to electrically connect nodes according to one implementation and FIG. 3B is a rear view of the cable reel 100. FIG. 3A is shown with only a single torsional spring 108a for simplicity. It should be understood that the cable reel 100 may comprise one, two or more torsional springs. In one embodiment of the present invention, the cable reel 100 is designed to electrically connect a voltage node on the connector 124 with a voltage node on the connector 146. In one case, the voltage node in the connector 124 may electrically connect to the connector 146 via a cable that traverses the slot 122, the slotted shaft 118 and then coupled to the inner end 125a of the torsional spring 108a. With the torsional spring 108a being composed of conductive material, the inner and the outer ends of the torsional spring 108a are electrically connected. The outer end of the torsional spring 108a that comprises the jutted element 141a that is mechanically coupled within the groove 142a of the cylindrical element 130 may be electrically connected to the connector 146 via a cable or wiring. Therefore, using the conductive torsional spring, a voltage node on the frame 102 that is static can be electrically connected to a voltage node on the rotatable element 104 that may be rotating in operation.

The use of one torsional spring may allow for a single pair of voltage nodes to be electrically connected between the frame 102 and the rotatable element 104. With the use of a second torsional spring that is electrically isolated from the first torsional spring, two pairs of voltage nodes may be electrically connected between the frame 102 and the rotatable element 104. With the use of a third torsional spring that is electrically isolated from the first and second torsional springs, three pairs of voltage nodes may be electrically connected between the frame 102 and the rotatable element 104. One skilled in the art would understand that the use of a plurality of electrically isolated torsional springs could allow for the electrically connection between a plurality of pairs of voltage nodes between the frame 102 and the rotatable element 104 with a one to one ratio. Each of the plurality of voltage nodes in the frame 102 may be coupled to an inner end of one of the torsional springs via a wire or cable through the slot 122 and the slotted shaft 118. These wires or cables could be combined within a single multi-stranded cable element or may be separate. Similarly, each of the plurality of voltage nodes in the rotatable element 104 may be coupled to an outer end of one of the torsional springs via a wire or cable through the cable interface element 144 and the grooves within the rotatable element 104. These wires or cables could also be combined within a single multi-stranded cable element or may be separate. It should be understood that other mechanical designs are possible for connecting one or more voltage nodes in the frame 102 to corresponding voltage nodes in the rotatable element 104 via the torsional springs.

The electrically connection of pairs of voltage nodes between the frame 102 and the rotatable element 104 may be used to transfer one or more DC voltages and/or an earth ground from outside of the cable reel 100 to a cable wrapped around the rotatable element 104 that is connected to the connector 146. For example, if a device (ex. video camera, sensor, etc.) coupled to the cable requires a particular DC voltage (ex. 24V) to operate, positive and negative voltage inputs for the particular required DC voltage could be applied to the connector 124 (on the back of the cable reel 100 of FIG. 3B) and the positive and negative voltages (ex. 24V, 0V) could be transferred to the cable via two torsional springs connecting to the connector 146. In a further example in which a device coupled to the cable requires a DC voltage and earth ground, the cable reel could be adapted to have three torsional springs to allow for electrically connecting three pairs of voltage nodes from the frame 102 to the rotatable element 104.

In some embodiments, there may be an AC to DC power supply external to the cable reel 100 that provides the desired voltage levels to the connector 124 or to another connector or to a plurality of connectors (not shown) in the frame 104. In other embodiments, there may be an AC to DC power supply integrated within the cable reel 100. In this case, an AC power source may be coupled to the connector 124 or another connector within the frame 102. The AC to DC power supply may be integrated within the frame 102 and have voltage nodes that provide a DC voltage level. These voltage nodes may be electrically connected to voltage nodes in the rotatable element 104 through the torsional springs as previously described. Alternatively, an AC voltage may be input to the frame 102 and transferred to the rotatable element 104 via the torsional springs. The AC voltage may then be converted to positive and negative DC voltages (ex. 24V, 0V) using an AC to DC power supply integrated within the rotatable element 104 or may simply transfer the AC voltage to a cable wrapped around the rotatable element 104. This implementation would be particularly useful in the case that one or more devices coupled to the cable require AC power to operate.

The above embodiments are focused on transferring DC or AC voltages from the frame 102 to the rotatable element 104 so that they can be transferred to a cable wrapped around the rotatable element and provided to one or more devices coupled to the cable. It should be understood that this implementation should not limit the scope of the present invention. In particular, a cable reel according to the present invention could be used to simply connect two voltage nodes together, one coupled to the frame 102 and one coupled to the rotatable element 104. This may be used to ensure devices use a common ground level or are electrically connected for protection purposes. Further, the cable reel according to the present invention may be used to transfer a voltage level from the rotatable element 104 to the frame 102. This could be useful in the case that a device coupled to a cable wrapped around the rotatable element 104 transmits one or more voltages that need to be measured/detected at a device coupled to the frame 102. In one specific example, the device may be a sensor (ex. a light sensor circuit) that generates a voltage and/or changes its impedance when light is detected. This voltage may need to be detected and/or measured at a device coupled to the frame 102. In this case, the voltage output from the device may be electrically connected via the cable to the connector 146 and via the torsional spring(s) to the connector 124. In another example, the device may be a device that changes impedance (ex. a dry contact system that goes from an open impedance to a shunt impedance depending on the position of the contacts). In this case, the impedance of the device may be detected by a circuit coupled to the frame 102 through the electrically coupling of the device through the torsional spring.

In some embodiments in which a plurality of pairs of voltage nodes are to be electrically connected between the frame 102 and the rotatable element 104, less than all of the pairs of voltage nodes may be electrically connected using a torsional spring. The use of a torsional spring to electrically connect voltage nodes allows for the mechanical devices reuse within the cable reel as a mechanical element and an electrical connection element. In some embodiments, one or more pairs of voltage nodes between the frame 102 and the rotatable element 104 may be electrically connected using other means than a torsional spring. In one implementation a flat cable or ribbon cable or flat flex cable is used to electrically connect one or more pairs of voltage nodes between the frame 102 and the rotatable element 104. In this case, the flat cable may be wrapped around the axle 116 within the cylindrical element 130, one end of the flat cable being coupled to the connector 124 via the slotted shaft 118 and the other end of the flat cable being coupled to the connector 146 via the cable interface element 144. In this case, the flat cable operates to electrically connect pairs of voltage nodes but is not used for mechanical purposes similar to a torsional spring. In one embodiment, a single torsional spring is implemented within the cable reel and is used to electrically connect a voltage node in the frame 102 to a voltage node in the rotatable element 104 and a flat cable is used to electrically connect one or more other voltage nodes in the frame 102 to one or more corresponding voltage nodes in the rotatable element 104. In other embodiments, no torsional spring may be used to electrically connect a voltage node in the frame 102 to a voltage node in the rotatable element 104. Instead, aspects of the present invention relate only to the transfer of data between the frame 102 and the rotatable element 104 as will be described. In this case, a torsional spring may be included for only mechanical purposes or may be replaced with another element such as a motor.

Along with electrically connecting voltage nodes between the frame 102 and the rotatable element 104, the cable reel 100 according to embodiments of the present invention may also transfer data between the frame 102 and the rotatable element 104. Transferring data between a static element and a rotating element using the torsional springs or flat cables are possible but there are significant limits on the bandwidth of data that could be transmitted. If data is transmitted on the torsional spring or the flat cable as described, radio interference can occur as the element can start acting as an antenna. One skilled in the art can use significant error correction algorithms or a very slow bit rate to manage the radio interference but this would limit the overall bandwidth of data that can be transferred. In other implementations, shielding could be added to the torsional spring or flat cable to reduce the interference created from their windings on the data being transmitted. The shielding adds cost and would still have limits on the bandwidth of data that could be transferred.

In embodiments of the present invention, the cable reel 100 uses torsional springs to electrically connect pairs of voltage nodes between the frame 102 and the rotatable element 104 to transfer voltages that may be used for powering one or more devices connected to a cable wrapped around the rotatable element 104. In addition, the cable reel 100 further comprises a data transfer apparatus 150 that can be used to independently transfer data between the frame 102 that may be static and the rotatable element 104 that may rotate in operation. By separating out the transfer of data, systems can be used to enable high bandwidth data transfer with minimal data error loss. Specifically, in two embodiments of the present invention that will be described in detail herein, capacitance coupling and free-space optical communications can be used to transfer data between the frame 102 and the rotatable element 104 independent of electrical connection of voltage nodes between the components. In both of these embodiments, transfer of data may occur without requiring physical contact between the frame 102 and the rotatable element 104 that may be in relative motion to each other in operation.

Figure 4A:
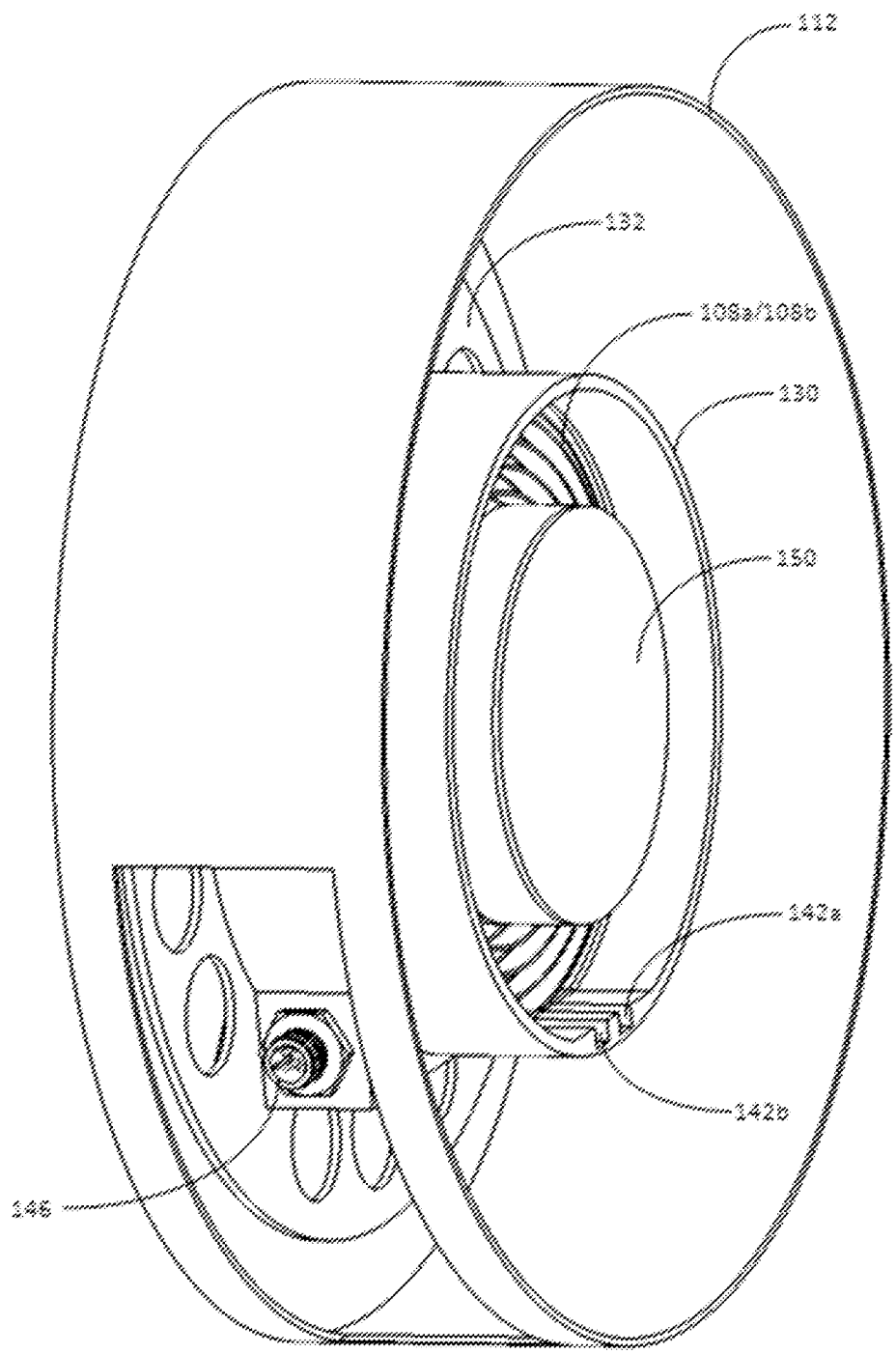
FIGS. 4A and 4B are views of one implementation of a cable reel incorporating a data transfer apparatus according to an embodiment of the present invention.
Figure 4B:
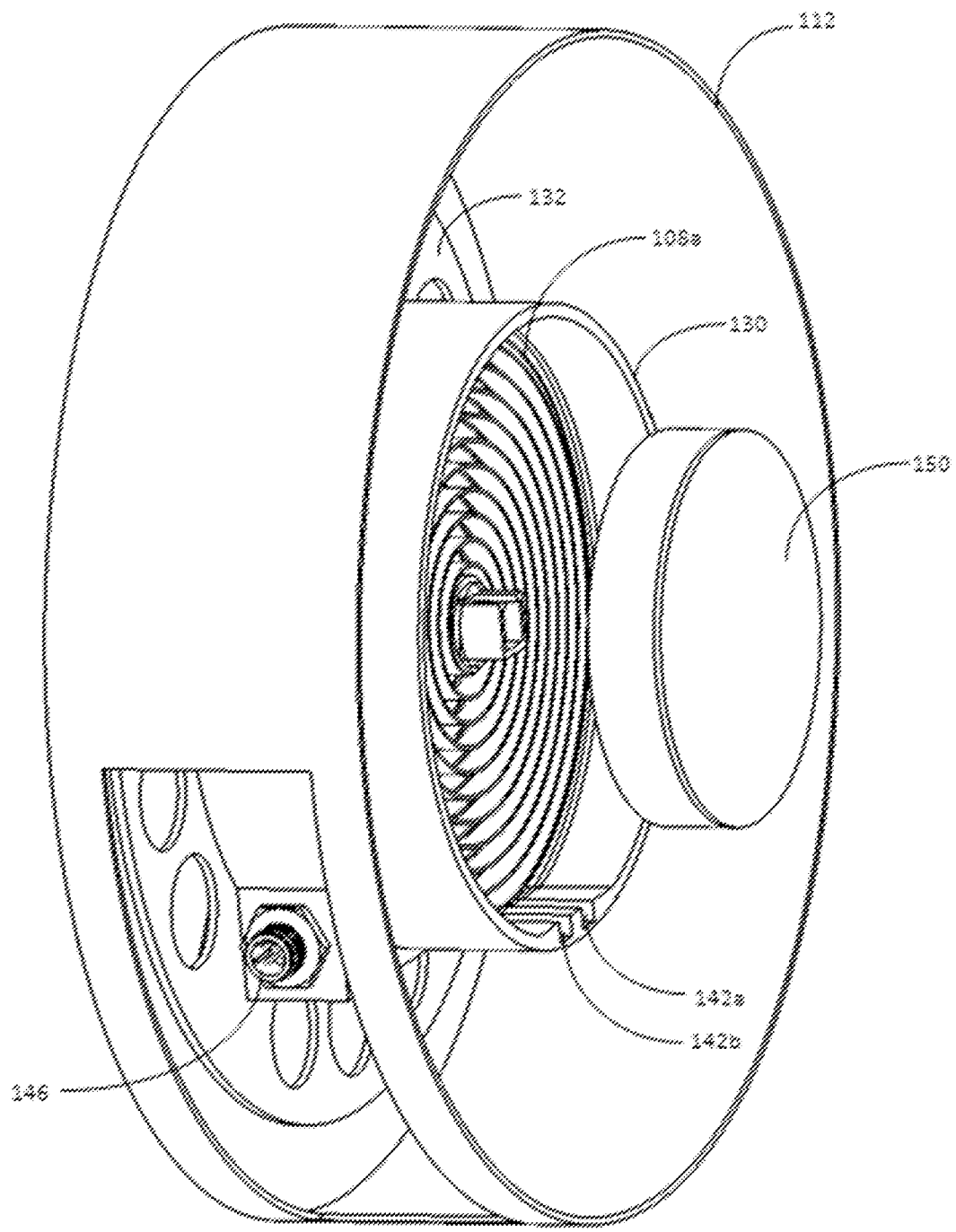

FIGS. 4A and 4B are views of one implementation of a cable reel 100 incorporating a data transfer apparatus 150 according to an embodiment of the present invention. In this embodiment, the data transfer apparatus 150 comprises a cylindrical element that has first and second ends, one connected to the frame 102 and one connected to the rotatable element 104. As will be described, the data transfer apparatus 150 is designed to allow data transfer between the frame 102 and the rotatable element 104 while the rotatable element 104 is rotating in operation relative to the frame 102. In FIGS. 4A and 4B, the data transfer apparatus 150 is integrated within the upper cavity of the cylindrical element 130 above the cylindrical plate 134 and the torsional springs 108a, 108b. In this case, it has a diameter less than the cylindrical element 130, though in some cases, the data transfer apparatus 150 may fit tightly into the interior walls of the cylindrical element 130 or may be another size or shape. In one embodiment, the bottom end of the data transfer apparatus 150 is coupled to the axle 116 and does not rotate with the rotatable element 104 while the top end of the data transfer apparatus 150 is coupled to the rotatable element 104 and rotates with it. In this embodiment, the circular walls may be connected to either the top or bottom ends and may rotate or not with the rotatable element 104. In some embodiments, as will be described, the data transfer apparatus 150 comprises connectors integrated into the top and the bottom ends that are adapted to be coupled to the connector 146 and connector 124 respectively.

In alternative embodiments, the data transfer apparatus 150 may be implemented in other manners in which one end of the apparatus is coupled to the frame 102 and is electrically coupled to the connector 124 and one end is coupled to the rotatable element 104 and electrically coupled to the connector 146. For instance, the ends of the data transfer apparatus 150 may be coupled to other elements within the upper or lower cavity of the cylindrical element 130. As will be described in more detail, elements within the data transfer apparatus 150 can maintain alignment such that data can be transferred while the rotatable element 104 rotates relative to the frame 102.

In some embodiments of the present invention, the cable wrapped around the rotatable element 104 is a coaxial cable and the connectors 124, 146 are connectors for coaxial cables. A coaxial cable has an inner conductor surrounded by a tubular insulating layer, surrounded by a tubular conducting shield. As is well known, the inner conductor of the coaxial cable may carry a data signal. Further, the inner conductor of the coaxial and the tubular conducting shield may carry positive and negative DC voltages respectively that can be used to power devices. In the case that a coaxial cable is used, data channels on the coaxial cable can be transferred between the frame 102 and the rotatable element 104 via the data transfer apparatus 150. DC voltages transferred to voltage nodes on the rotatable element 104 via one or more of the torsional springs 108a,108b may be coupled to the coaxial cable wrapped around the rotatable element 104 so that the coaxial cable can be the source of DC power for one or more remotely located devices coupled to the coaxial cable.

Figure 5:
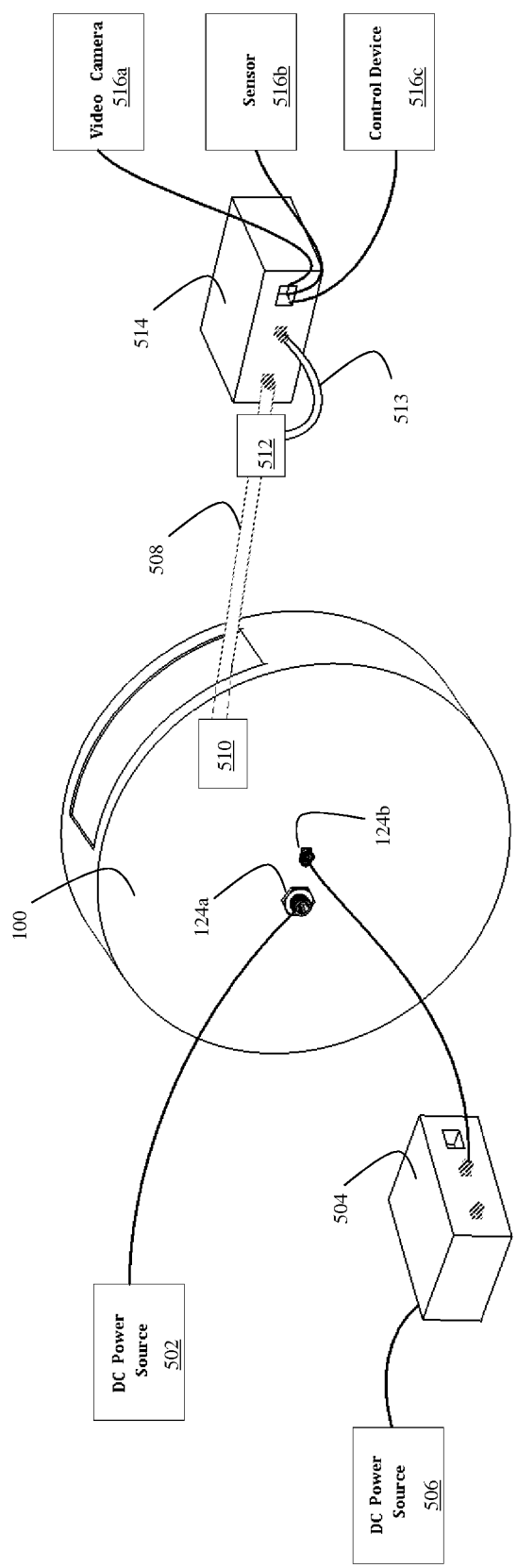
FIG. 5 is a logical system diagram using the cable reel of FIGS. 1A and 1B according to one embodiment of the present invention.

FIG. 5 is a logical system diagram using the cable reel 100 according to one embodiment of the present invention. As shown, the cable reel 100 in this embodiment comprises connectors 124a, 124b. The connector 124a is coupled to a DC power source 502 that can be used to couple DC voltages onto a coaxial cable 508 that may be wrapped around the rotatable element 104 and extracted and/or retracted as may be required in operation. The DC voltages may be coupled onto the coaxial cable 508 by transferring the voltages through the torsional springs 108a, 108b as previously described and using a DC voltage coupling element 510 integrated with the rotatable element 104 within the cable reel 100 to couple the DC voltages onto the coaxial cable. The connector 124b is coupled to a first Multimedia Over Coaxial Alliance (MOCA) component 504 that can convert data between a digital format such as Ethernet and an analog format that can be transmitted over a coaxial cable. As shown, the MOCA component 504 may be powered by a DC power source 506. The DC power sources 502 and 506 may be the same component or may be separate components. Data transferred through the first MOCA component 504 may be transferred via the connector 124b to/from the cable 508 via the data transfer apparatus 150. In essence, the coaxial cable 508 may receive DC power from the DC power source 502 via the connector 124a, the torsional springs 108a/108b and the DC voltage coupling element 510 and may receive/transmit data to/from the first MOCA component 504 via the data transfer apparatus 150 and the connector 124b.

Further, at a remote location, the cable 508 may be coupled to a DC voltage decoupling element 512 that may allow for decoupling of the DC voltages that were coupled onto the coaxial cable 508. A coaxial output and a DC power output from the DC voltage decoupling element 512 are coupled to a second MOCA component 514 that may be powered by the DC power coupled on the coaxial cable 508. The second MOCA component 514 may convert data between an analog format that can be transmitted over a coaxial cable and a digital format such as Ethernet. As shown, the second MOCA component 514 may be coupled to a plurality of devices 516a, 516b, 516c that input and/or output data in Ethernet format. The devices 516a, 516b, 516c may perform a variety of functions and, in some embodiments, may comprise a video camera, a sensor and/or a control device. Data generated by the devices 516a, 516b, 516c can be converted to an analog format capable to be transmitted via the coaxial cable 508 by the second MOCA component 514 and then transmitted via the cable 508 and the cable reel 100 (via the data transfer apparatus 150) to the first MOCA component 504 which then can convert the data to an Ethernet format that can be received by another component (not shown). Data input into the first MOCA component 504 may be converted from an Ethernet format to an analog format capable to be transmitted via the coaxial cable 508 by the first MOCA component 504 and then transmitted via the cable reel 100 (via the data transfer apparatus 150) and the cable 508 to the second MOCA component 514 which then can convert the data back to an Ethernet format that be received by the devices 516a, 516b, 516c. In particular implementations of the present invention, the MOCA components 504, 514 operate at a frequency range of 1000 to 1500 MHz, though other frequencies may be used. This frequency range works well in data communication over coax and is not subject to intense broadcast frequencies or cellular spectrum interference.

It should be understood that, although described using MOCAs that translate between Ethernet and an analog format, other translation devices could be used and other data formats could be implemented depending on the particular requirements of the components on either end of the communications. In one alternative embodiment, Ethernet-over-Coax (EoC) technology may be utilized. In other alternative embodiments, non-Ethernet formats and/or non-coax physical layers may be used. In some embodiments, there may not be a need for the MOCA components 504, 514 or similar translation devices. For instance, in the case that the devices 516a, 516b, 516c are adapted to receive/transmit data in the same format that data is transmitted on the cable 508, there would be no need for a translation function and potentially the cable 508 could be directly connected to one or more of the devices 516a, 516b, 516c or may be connected to the devices via a multiplexing component. In some embodiments, additional power amplifiers may be integrated to boost the signal on the transmitting end to ensure data is transferred sufficiently across the data transfer apparatus 150.

Figure 6:
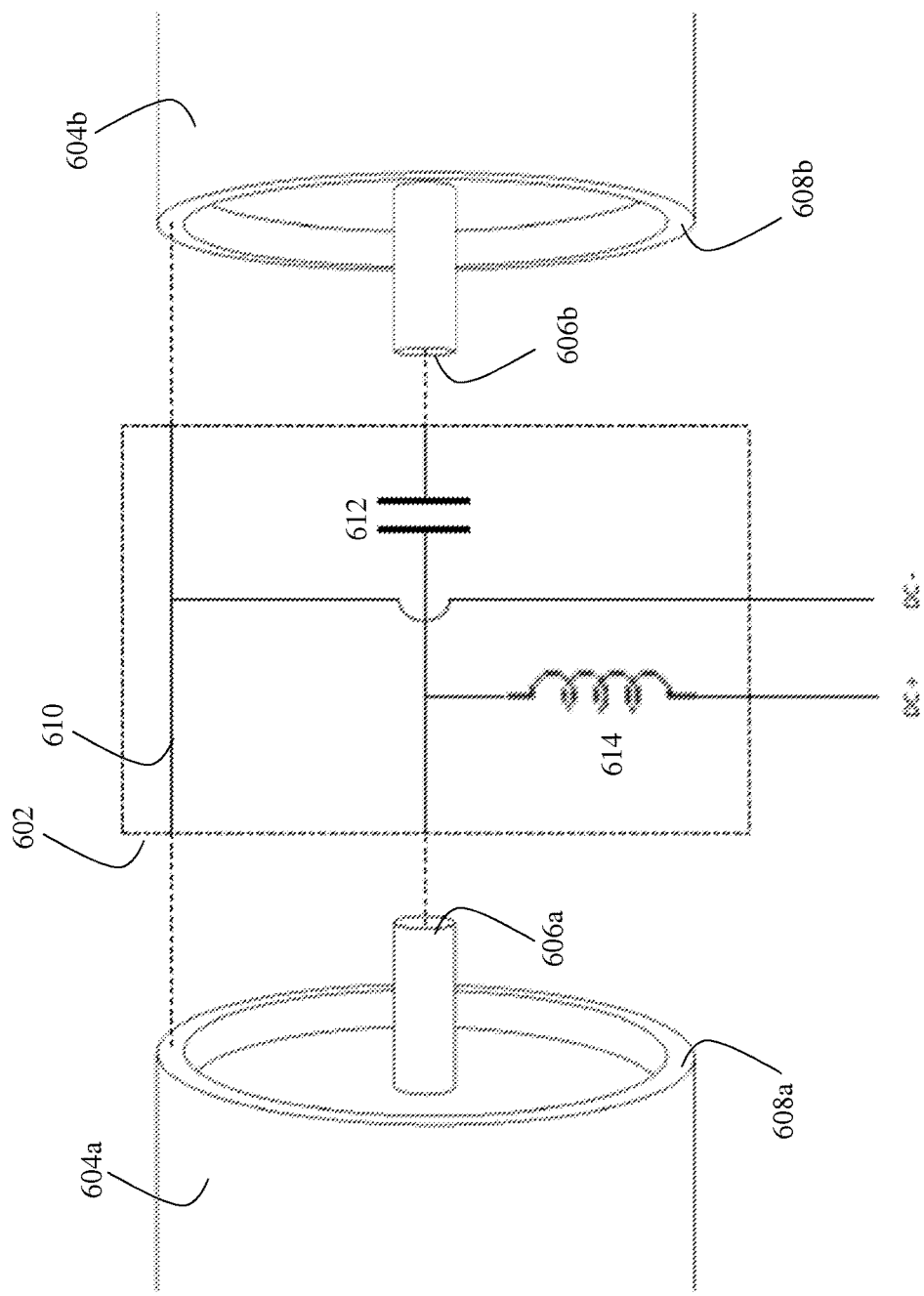
FIG. 6 is a circuit diagram for coupling or decoupling DC power to/from a coaxial cable according to one implementation.

FIG. 6 illustrates a circuit diagram for coupling or decoupling DC power to/from a coaxial cable according to one implementation. As shown, a DC voltage coupling/decoupling element 602 is connected between a first coaxial cable 604a comprising a center core 606a surrounded by an outer metallic shield 608a and a second coaxial cable 604b comprising a center core 606b surrounded by an outer metallic shield 608b. As is well-known in the art, a coaxial cable typically includes insulation between the center core and the outer metallic shield and further includes a plastic jacket surrounding the outer metallic shield. The DC voltage coupling/decoupling element 602 comprises a pass through 610 that connects the outer metallic shields 608a, 608b of the first and second coaxial cables 604a, 604b and is further coupled to a negative DC voltage node (DC−). Further, the DC voltage coupling/decoupling element 602 comprises a capacitor 612 coupled between the center cores 606a, 606b of the first and second coaxial cables 604a, 604b and an inductor 614 coupled between a positive DC voltage node (DC+) and a node between the center core 606a of the first coaxial cable 604a and the capacitor 612. In one implementation, the capacitor 612 may be 1000 pF and the inductor 614 may be 1000 nH though other values for these elements may be used in other embodiments. As will be described, the DC voltage coupling/decoupling element 602 may act as an isolation circuit with the capacitor 612 acting as an isolation element for DC and/or the inductor 614 acting as an isolation element for high frequency data signals.

The DC voltage coupling/decoupling element 602 can be used to couple DC voltages onto the first coaxial cable 604a if a DC voltage is applied to the positive and negative DC voltage nodes (DC+, DC−). In this case, the DC voltage coupling/decoupling element 602 may comprise the DC voltage coupling element 510, the first coaxial cable 604a may be a first end of the cable 508 that is inside the cable reel 100 while the second coaxial cable 604b may be a cable that connects to the data transfer apparatus 150 within the cable reel 100. The DC voltage nodes (DC+, DC−) may be nodes connected to the torsional springs 108a, 108b that are coupled to the DC power source 502. In this case, the capacitor 612 is used to block the DC voltage from passing to the center core 606b of the second coaxial cable 604b and therefore be applied to the data transfer apparatus 150. In essence, the capacitor 612 acts as an isolation element for the DC. The capacitor 612 only blocks DC and allows Ultra High Frequency (UHF) radio wave frequencies to pass freely between the first coaxial cable 604a and the second coaxial cable 604b. In one example in which the capacitor 612 is 1000 pF and the data is transmitted at 1 GHz, the coaxial cable 604b may be 50Ω or 75Ω and the capacitor 612 may represent only an impedance of approximately 0.16Ω (effectively a closed circuit for the RF). The inductor 614 has the opposite effect and only allows DC to pass while blocking all radio frequencies from leaving the coaxial cables 604a, 604b and traveling to the torsional springs 108a, 108b and potentially back to the DC power source 502. In essence, the inductor 614 acts as an isolation element for high frequency data signals. Having the radio frequencies blocked reduces the potential of local interference within the cable reel 100, thus preventing wires/cables or the torsional springs 108a, 108b (which may be unshielded) from acting as an antenna. In one example in which the inductor 614 is 1000 nH and the data is transmitted at 1 GHz, the inductor 614 may represent an impedance of approximately 6300Ω (effectively an open circuit for the RF).

Similarly, the DC voltage coupling/decoupling element 602 can be used to decouple DC voltages that are on the first coaxial cable 604a and apply the DC voltage to the positive and negative DC voltage nodes (DC+, DC−). In this case, the DC voltage coupling/decoupling element may comprise the DC voltage decoupling element 512, the first coaxial cable 604a may be a second end of the cable 508 external to the cable reel 100, and the second coaxial cable 604b may be a cable that connects into a data input/output of the second MOCA component 514. The DC voltage nodes (DC+, DC−) may be nodes connected to a DC power input of the second MOCA component 514 via a cable 513, which may be used to provide DC power to the second MOCA component 514. In this case, the capacitor 612 is used to block the DC voltage from passing to the center core 606b of the second coaxial cable 604b and therefore be applied to the data input/output of the second MOCA component 514. The capacitor 612 only blocks DC and allows Ultra High Frequency (UHF) radio wave frequencies to pass freely between the first coaxial cable 604a and the second coaxial cable 604b. The inductor 614 has the opposite effect and only allows DC to pass while blocking all radio frequencies from leaving the coaxial cables 604a, 604b and traveling to the DC power input of the second MOCA component 514 via the cable 513. Preventing the DC from being input to the data input/output of the second MOCA component 514 and preventing the radio frequencies from being input to the DC power input of the second MOCA component 514 can ensure proper operation of the second MOCA component 514, though in some embodiments this prevention may not be necessary.

In some implementations of a DC voltage coupling or decoupling element, the capacitor 612 may not be necessary, the inductor 614 may not be necessary and/or other components may be added to the element. Further, in some embodiments, other values of capacitance or impedance or resistance is applied in the DC voltage coupling or decoupling element. In some embodiments, multiple stages of inductive and capacitive filtering may be implemented within an isolation circuit to isolate DC from the data signal. In its simplest form, a DC voltage coupling or decoupling element may connect the outer metallic shields 608a, 608b to each other and to a negative DC voltage node (DC−) and connect the center cores 606a, 606b to each other and to a positive DC voltage node (DC+), with no other isolation components.

Although the DC voltage coupling element 510 is depicted as being integrated within the rotatable element, it should be understood that in some embodiments coupling and decoupling of DC voltages onto a coaxial cable may occur in other locations. For instance, there may be a DC voltage coupling element external to the cable reel 100 that allows the DC power source 502 or the DC power source 506 or another DC power source to couple DC voltages onto the coaxial cable connecting between the first MOCA component 504 and the connector 124b. In this case, an inductor may be implemented to protect the first MOCA component 504 from DC while a capacitor may be implemented to protect the DC power source from RF. In this case, a coaxial cable (not shown) internal to the cable reel 100 may connect to the connector 124b and then to a DC voltage decoupling element that separates the DC voltages that may be applied to the torsional springs 108a, 108b and a coaxial cable that may be connected to the data transfer apparatus 150. In this implementation, the connector 124a may not be implemented.

Figure 7A:
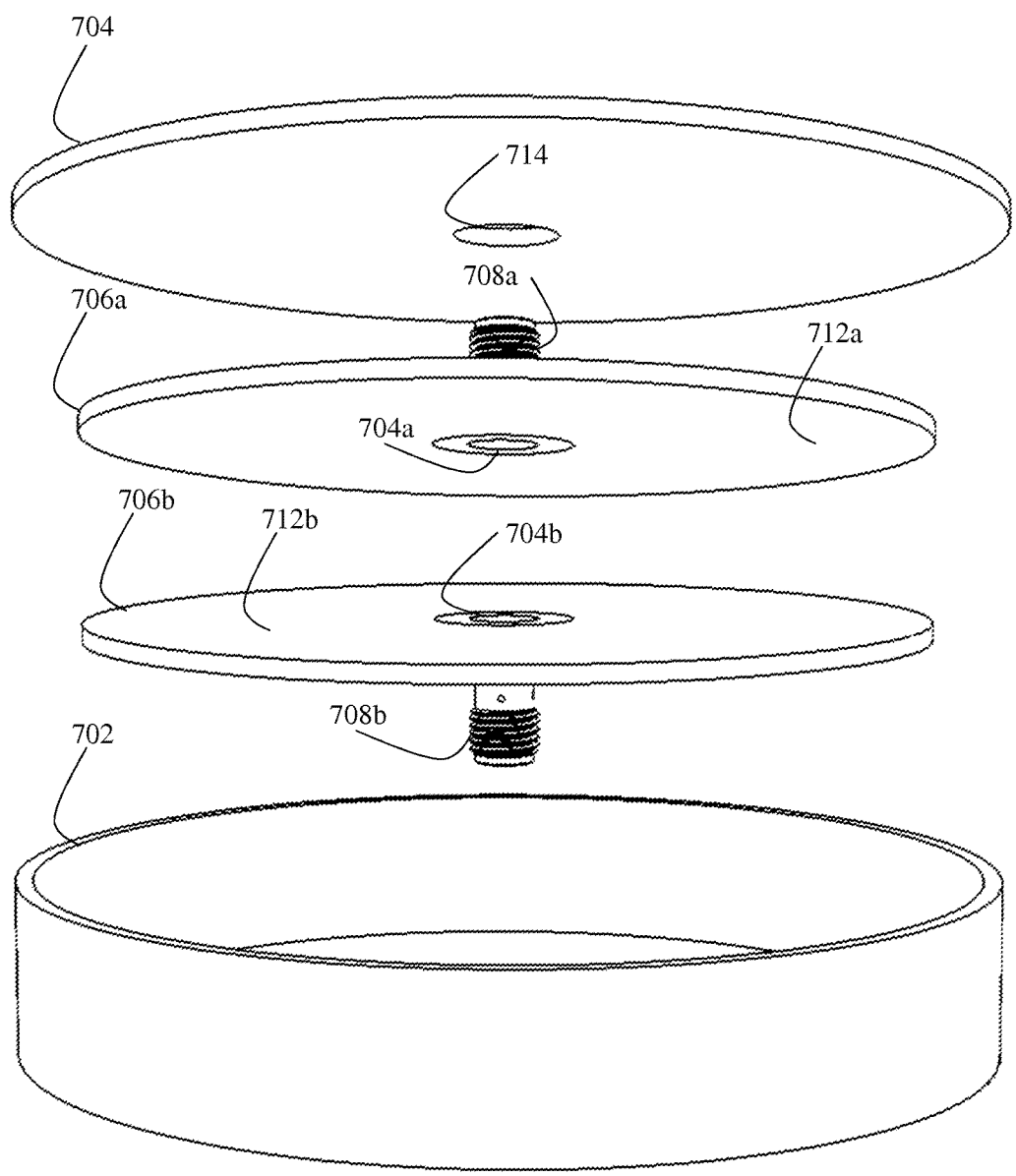
FIGS. 7A and 7B are breakout views of an implementation of the data transfer apparatus of FIGS. 4A and 4B using a capacitance coupling apparatus.
Figure 7B:
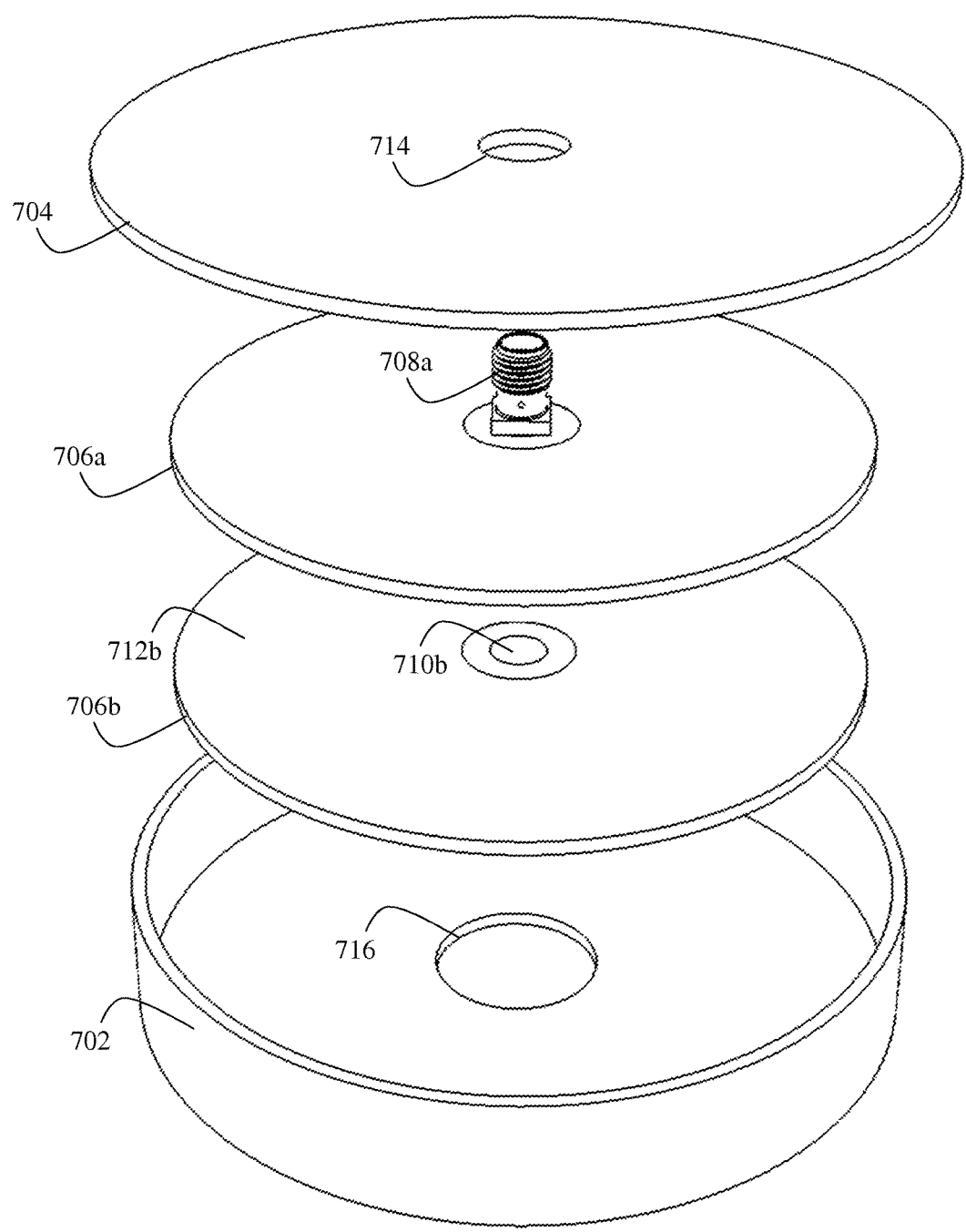

In some embodiments of the present invention, the data transfer apparatus 150 comprises a capacitance coupling apparatus in which data is transferred using two capacitive plates that together form a capacitor. In these embodiments, one of the capacitive plates may rotate relative to the other capacitive plate but would still allow for data transfer during rotation. FIGS. 7A and 7B are breakout views of an implementation of the data transfer apparatus 150 using a capacitance coupling apparatus. As shown, the data transfer apparatus 150 comprises an encasement base 702 and cover 704 that together form a cylindrical encasement that holds first and second capacitive plates 706a, 706b. In the embodiment illustrated, the encasement base 702 is an opened ended cylinder while the cover 704 is a circular disk, though it should be understood that other implementations may have different shapes and sizes of encasements for the data transfer apparatus 150.

The cover 704 is integrated with the first capacitive plate 706a and the encasement base is integrated with the second capacitive plate 706b. In one case, the encasement base 702 and the second capacitive plate 706b may be coupled to the frame 102 and may be static, while the cover 704 and the first capacitive plate 706a may be coupled to the rotatable element 104 and be rotatable in operation. In another case, the cover 704 and the first capacitive plate 706a may be coupled to the frame 102 and may be static, while the encasement base 702 and the second capacitive plate 706b may be coupled to the rotatable element 104 and be rotatable in operation. In either case, the two capacitive plates 706a, 706b may be separated slightly and rotatable in operation relative to each other. The encasement base 702 and the cover 704 are used to protect the capacitive plates 706a, 706b but are also rotatable in operation relative to each other. In some implementations, the edges of the encasement base 702 that are close to edges of the cover 704 are coated in a lubricant to reduce friction and heat in case of physical contact.

The first capacitive plate 706a may comprise a circular disk connected to a connector 708a. The connector 708a in one implementation may be a coaxial connector that can allow a coaxial cable to connect to the first capacitive plate 706a. The circular disk can comprise a circular copper track 710a that is centered on the circular disk and is of a first diameter and an annular copper track 712a that surrounds the circular copper track 710a and is of a second diameter. As shown, the annular copper track 712a is effectively an annulus with an outer diameter equal to the second diameter and an inner diameter slightly larger than the first diameter. In this design, the circular and annular copper tracks 710a, 712a are separated by a small etching so that each of the tracks is electrically isolated. In the case that the connector 708a is a coaxial connector, a center element of the connector 708a may be connected to a center core of a coaxial cable and an outer element of the connector 708a may be connected to an outer metallic shield of the coaxial cable. In embodiments of the present invention, the inner element of the connector 708a is connected to the circular copper track 710a and the outer element of the connector 708a is connected to the annular copper track 712a.

Similarly, the second capacitive plate 706b may comprise a circular disk connected to a connector 708b. The connector 708b in one implementation may be a coaxial connector that can allow a coaxial cable to connect to the first capacitive plate 706b. The circular disk can comprise a circular copper track 710b that is centered on the circular disk and is of the first diameter and an annular copper track 712b that surrounds the circular copper track 710b and is of the second diameter.

The first diameter may be relatively small compared to the overall diameter of the circular disks of the first and second capacitive plates 706a, 706b. In one implementation, the first diameter may be approximately equal to the inner diameter of a coaxial cable. In this case, the connectors 708a, 708b that may comprise a plurality of legs for connecting the connector to a PCB could be directly connected to the circular disk without additional track routing. In particular, a central leg of the connector 708a, 708b adapted to be connected to a central core of a coaxial cable connected to the connector could be connected to the corresponding circular copper tracks 710a, 710b and a set of outer legs of the connector 708a, 708b adapted to be connected to an outer metallic shield of a coaxial cable connected to the connector could be connected to the corresponding annular copper tracks 712a, 712b. These connections, if the first diameter is sufficiently small, can be done directly through the capacitive plates 706a, 706b.

The first and second capacitive plates 706a, 706b when separated slightly can form a capacitor. The circular copper tracks 710a, 710b can form a first capacitor and the annular copper tracks 712a, 712b can form a second capacitor. If data is being transmitted over a coaxial cable connected to one of the connectors 708a, 708b, the data can be transferred across the capacitors formed with the first and second capacitive plates 706a, 706b. The first capacitor formed with the circular copper tracks 710a, 710b effectively allows for data being communicated on a center core of a coaxial cable connected to the connector 708a to be transferred to a center core of a coaxial cable connected to the connector 708b. Similarly, data being communicated on a center core of a coaxial cable connected to the connector 708b to be transferred to a center core of a coaxial cable connected to the connector 708a. The second capacitor that is formed with the annular copper tracks 712a, 712b can be used to shield the data communication and ensure outside interference does not affect the transmission. This shield-coupling capacitance is further optimized as a relatively large capacitance using large effective capacitive plates that ensure the contiguous shielding of the center pin and represents an insignificant inconsistency in the distributed impedance of the coupled coaxial cable for all ultra high frequencies. If one of the capacitive plates 706a rotates relative to the other capacitive plate 706b, the circular nature of the capacitive plates 706a, 706b, allow for the continued alignment of the appropriate circular copper tracks 710a, 710b on the plates and therefore the continual transfer of data across the capacitor that is formed.

In some embodiments, it should be understood that additional sets of annular tracks of increasing diameter surrounding the circular tracks 710a, 710b may be used to transfer other data, for example for higher bandwidth applications or for data that may be in another format. In particular, additional annular copper tracks may be used to communicate a plurality of channels of data simultaneously. Further, in some embodiments, the use of a plurality of sets of annular copper tracks could replace the need to have the central circular copper tracks 710a, 710b. Further, although the circular tracks 710a, 710b depicted in FIGS. 7A and 7B are of the same diameter, it should be understood in some implementations these could be different diameters. Similarly, the diameters of the annular copper tracks 712a, 712b could be different in some implementations. In some implementations, a lubricant may be applied between the capacitive plates 706a, 706b, including, but not limited to, grease and/or Teflon. In other embodiments, no lubricant is applied as the two capacitive plates 706a, 706b may be sufficiently separated that contact between the elements would never occur. In various embodiments, air can be used as the dielectric, while in other embodiments, any material with good dielectric properties can be used as the separating dielectric. Further, although described using copper tracks, it should be understood that other conductive materials could be used when forming the tracks on the capacitive plates 706a, 706b.

Figure 7C:
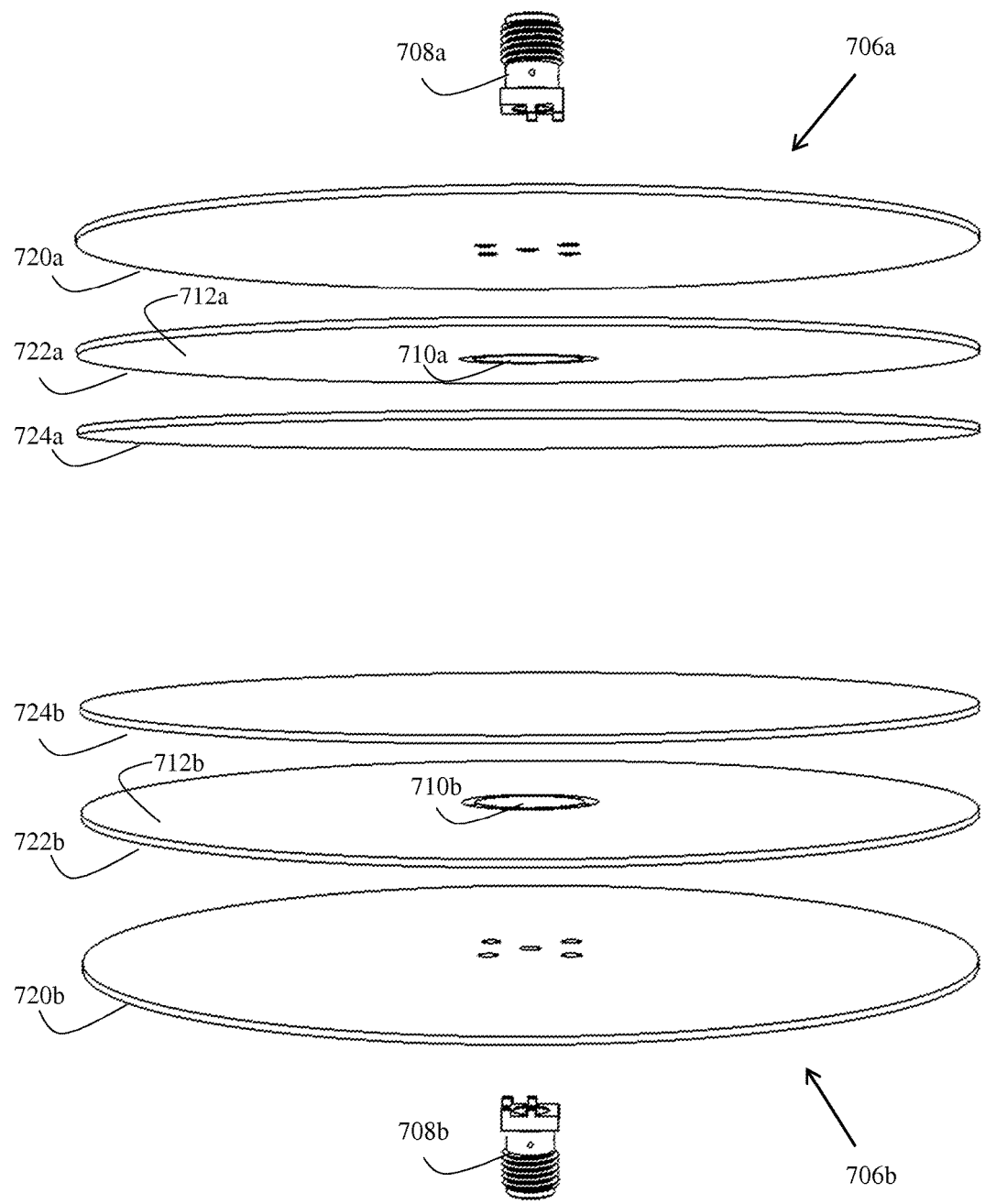
FIG. 7C is a breakout view of an implementation of two capacitive plates within the capacitance coupling apparatus of FIGS. 7A and 7B.

FIG. 7C is a breakout view of an implementation of two capacitive plates within the capacitance coupling apparatus of FIGS. 7A and 7B. As shown, the capacitive plate 706a comprises a printed circuit board comprising a plurality of layers. As shown in broken out view in FIG. 7C, the capacitive plate 706a comprises a connector layer 720a, a copper layer 722a and an insulation layer 724a. The connector layer 720a may comprise an FR4 layer that is adapted with holes for attachment of the connector 708a. The copper layer 722a is adapted to have the circular track 710a and annular track 712a etched into the layers. The connector 708a is adapted to be connected to the circular track 710a and annular track 712a through the connector layer 720a. Similarly, the capacitive plate 706b comprises a connector layer 720b, a copper layer 722b and an insulation layer 724b. The insulation layers 724a, 724b are adapted to prevent the copper layers 722a, 722b from coming in contact.

In one sample implementation, the connector layers 720a, 720b combined with their corresponding copper layers 722a, 722b are 0.0625" thick while the insulation layers 724a, 724b are 0.010" thick. The two copper layers 722a, 722b may be separated with a total of 0.034" of material in one implementation, a total of 0.020" of insulation layers 724a, 724b (2×0.010") with a dielectric constant of 4.3 and a total of 0.010" of a material such as Teflon with a dielectric constant of 2.0. Between the Teflon layer and the two insulation layers 724a, 724b, there may be grease with a thickness up to 0.002". The Teflon layer and grease provide a reduced friction surface when the two capacitive plates 706a, 706b rotate relative to each other. It should be understood that this specific implementation should not limit the scope of the present invention and many other implementations for a capacitive plate may be used. A capacitive plate is an element that is half a capacitor and that when brought close to another capacitive plate can electrically form a capacitor element. By having the circular capacitive plates, the two plates can maintain a relatively consistent capacitance as one capacitive plate may rotate relative to the capacitive plate.

There may be limitations to the implementation as described with reference to FIGS. 7A-7C due to the standing wave ratio and impedance matching aspect of ultra high frequencies. Although there may not be any technical limits to the diameter of the outermost annulus that is associated with the shielding of the coaxial cable, there may be considerations of linearity of response with respect to the center pin that may carry a data signal. In the specific case of MOCA, the signal is typically broadband over a range of 500 MHz starting at 1000 MHz and ending at 1500 MHz. In this case, it is desirable to have a transfer characteristic at the capacitive plate that is relatively similar across the entire range of frequencies. For this condition to hold, the inner circular track of the capacitive plate should not be so large as to approach the resonant quarter wave antenna size of any of these frequencies. As the size of the inner circular track of the capacitive plate increases it will approach the quarter wave length of 1500 MHz which corresponds to 5 cm. It is desirable to avoid an inner circular copper track approaching this size or larger. Fortunately, there is sufficient capacitance created by a 2 cm diameter or less circular copper track to decrease the impedance to less than 30Ω over the range of used frequencies, thus rendering insignificant the impedance mismatch of the two coupled cables at the capacitive plates. It is noted that, if the impedance of the capacitor formed by the two circular copper tracks is too high, which may be caused by the capacitive plates being too distant or the circular tracks being too small, significant signal reflections at the plates may result, causing poor signal coupling.

Figure 8A:
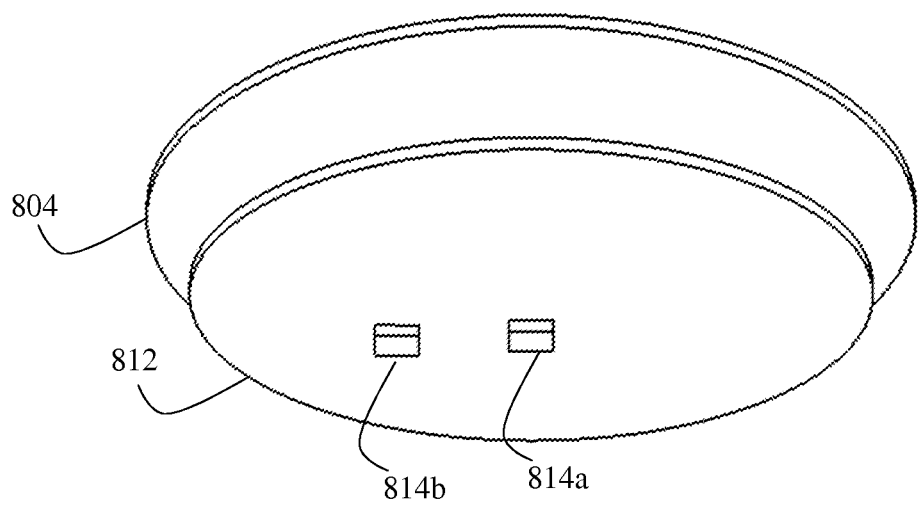
FIGS. 8A and 8B are breakout views of first and second embodiments of alternative embodiments of the data transfer apparatus of FIGS. 4A and 4B using free-space optical communication apparatus.
Figure 8A:
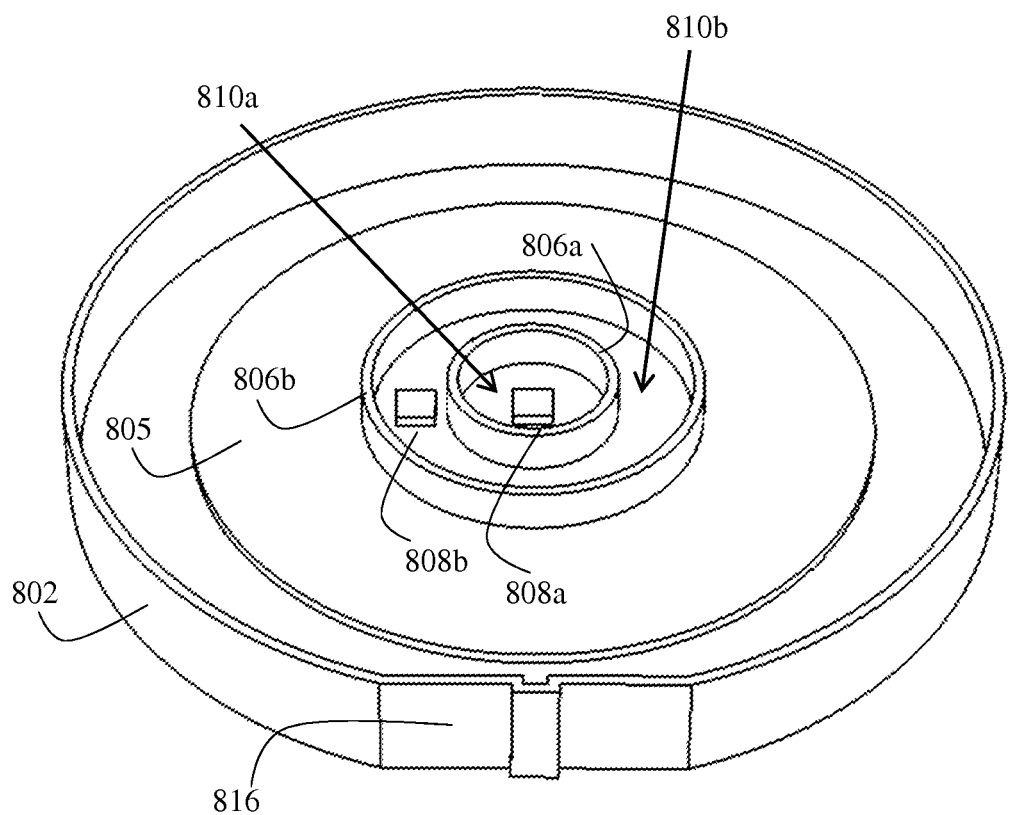
Figure 8B:
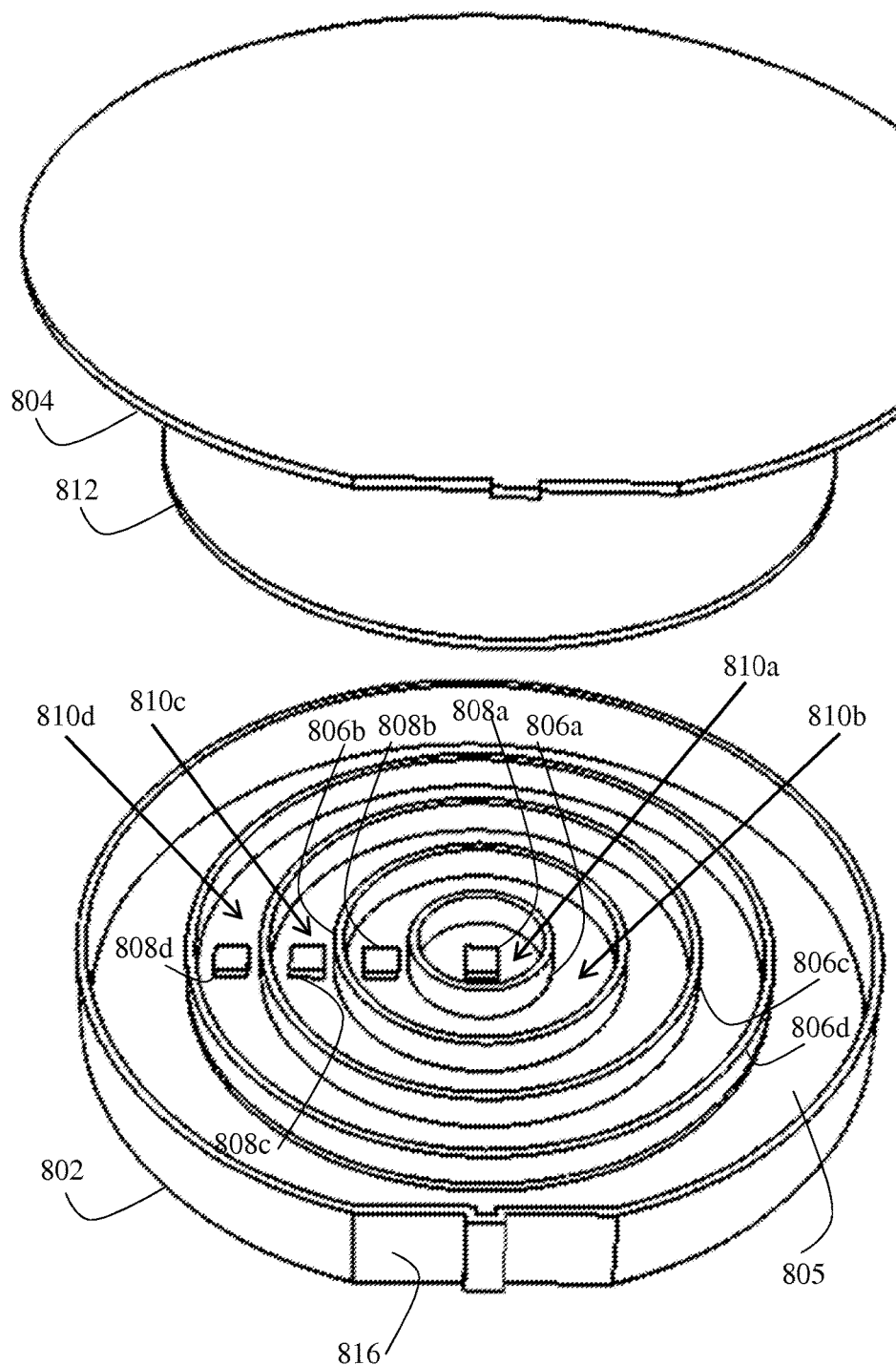

In some embodiments of the present invention, the data transfer apparatus 150 comprises a free-optic communication apparatus in which data is transferred by light using one or more optical transmitters and one or more optical receivers. In these embodiments, at least one device capable of optical transmission may rotate relative to at least one device capable of optical reception but would still allow for data transfer during rotation using modulated light that may be implemented over a wide range of wavelengths which may or may not be visible to the human eye. FIGS. 8A and 8B are breakout views of first and second embodiments of alternative embodiments of the data transfer apparatus 150 using free-space optical communication apparatus. As shown, the data transfer apparatus 150 comprises an encasement base 802 and cover 804 that together form a cylindrical encasement that holds first and second communication modules 805, 812, the first communication module 805 integrated with the encasement base 802 and the second communication module 812 integrated with the cover 804. In the embodiment illustrated, the encasement base 802 is an open-ended cylinder while the cover 804 is a circular disk, though it should be understood that other implementations may have different shapes and sizes of encasements for the data transfer apparatus 150. For instance, in some embodiments, both the encasement base 802 and the cover 804 may comprise open-ended cylinders that may connect together to form a closed cylinder.

In one case, the encasement base 802 and the first communication module 805 may be coupled to the frame 102 and may be static, while the cover 804 and the second communication module 812 may be coupled to the rotatable element 104 and be rotatable in operation. In another case, the cover 804 and the second communication module 812 may be coupled to the frame 102 and may be static, while the encasement base 802 and the first communication module 805 may be coupled to the rotatable element 104 and be rotatable in operation. Within FIG. 8A, the encasement base 802 has a groove 816 that can allow for mechanical attachment of the encasement base 802 to the frame 102 or the rotatable element 104. In other implementations, the groove may not be required or the groove 816 may instead be implemented within the cover 804. In some cases, for mechanical attachment purposes, there may be two different grooves implemented within the encasement base 802 and the cover 804 to enable attachment.

The first and second communication modules 805, 812 may be parallel to each other and separated slightly and rotatable in operation relative to each other. The encasement base 802 and the cover 804 are used to protect the communication modules and limit exposure to external light but are also rotatable in operation relative to each other. In some implementations, the edges of the encasement base 802 that are close to edges of the cover 804 are coated in a lubricant to reduce friction and heat in case of physical contact.

As shown, the first communication module 805 comprises a circuit board integrated with first optical communication devices 808a, 808b located within cylindrical walls 806a, 806b. In this implementation, the circuit board is circular. The cylindrical walls 806a, 806b comprise open-ended cylinders perpendicularly attached to the circuit board with first and second diameters, with one cylindrical wall 806b surrounding the other cylindrical wall 806a. The cylindrical walls 806a, 806b create first and second optically isolated zones 810a, 810b within which the first optical communication devices 808a, 808b may operate independently without affecting each other. In the embodiment of FIG. 8A, the first optically isolated zone 810a is a circular zone centered within the first communication module 805 and the second optically isolated zone 810b is an annular zone surrounding the first optically isolated zone 810a. The second communication module 812 comprises a circuit board with second optical communication devices 814a, 814b. In this implementation, the circuit board is circular. As shown in FIG. 8A, the second optical communication device 814a is aligned to be within the first optically isolated zone 810a and the second optical communication device 814b is aligned to be within the second optically isolated zone 810b. Each of the first optical communication devices 808a, 808b may be an optical transmitter, an optical receiver or a device capable of both optical transmission and reception. Similarly, each of the second optical communication devices 814a, 814b may be an optical transmitter, an optical receiver or a device capable of both optical transmission and reception.

Within the first optically isolated zone 810a, the first and second optical communication devices 808a, 814a can optically communicate. For instance, the first optical communication device 808a may be capable of optical transmission and the second optical communication device 814a may be capable of optical reception and/or the second optical communication device 814a may be capable of optical transmission and the first optical communication device 808a may be capable of optical reception. In essence, communication can take place from the first device 808a to the second device 814a and/or from the second device 814a to the first device 808a. In some implementations, the first device 808a and the second device 814a may be directly aligned in the centers of the optical communication elements 805,812, though alignment is not necessary for communication as they are within the optically isolated zone 810a which allows for data to be transferred within the zone using modulated light. In operation, even as the first and second communication modules 805, 812 may rotate relative to each other, data communication between the first and second optical communication devices 808a, 814a can be maintained within the first optically isolated zone 810a since the integrity of the zone itself is maintained in rotation.

Within the second optically isolated zone 810b, the first and second optical communication devices 808b, 814b can optically communicate. For instance, the first optical communication device 808b may be capable of optical transmission and the second optical communication device 814b may be capable of optical reception and/or the second optical communication device 814b may be capable of optical transmission and the first optical communication device 808b may be capable of optical reception. In essence, communication can take place from the first device 808b to the second device 814b and/or from the second device 814b to the first device 808b. In operation, even as the first and second communication modules 805, 812 may rotate relative to each other, data communication between the first and second optical communication devices 808b, 814b can be maintained within the second optically isolated zone 810b since the integrity of the zone itself is maintained in rotation. Direct alignment of the first and second optical communication devices 808b, 814b is not necessary for communication as the elements 805,812 may rotate relative to each other as the devices are within the optically isolated zone 810b, which allows for data to be transferred within the zone using modulated light.

In some alternative embodiments, there may be a plurality of optical communication devices integrated within the first communication module 805 and/or a plurality of optical communication devices integrated within the second communication module 812 within one or more of the optically isolated zones 810a, 810b. The plurality of optical communication devices within a particular optically isolated zone can provide duplicate signal transmission and/or duplicate signal reception capabilities across a plurality of locations within the optically isolated zones. In particular, in the case that a plurality of devices capable of optical transmission is implemented, the plurality of devices could transmit identical data simultaneously and be physically spread out within the optically isolated zone to ensure even distribution of the modulated light signals. This ensures that a device capable of optical reception within the optically isolated zone will be capable of reception of the data signal irrespective of the rotational position of the first and second communication modules 805,812 relative to each other. Similarly, in the case that a plurality of devices capable of optical reception is implemented, the plurality of devices could be physically spread out within the optically isolated zone to ensure reception of modulated light signals irrespective of the location of the source of the modulated light within the optically isolated zone. This ensures that a device capable of optical reception within the optically isolated zone will be capable of reception of the data signal irrespective of the rotational position of the first and second communication modules 805,812 relative to each other.

FIG. 8B illustrates an alternative embodiment of the free-optic communication apparatus of FIG. 8A. Within FIG. 8B, more than two optically isolated zones are implemented to allow for more than two channels of communications simultaneously. In this implementation, the first communication module 805 comprises four cylindrical walls 806a, 806b, 806c, 806d of increasing diameters instead of only two. It should be understood that other numbers of cylindrical walls may be implemented from one to a large number. Within FIG. 8B, the cylindrical walls 806a, 806b, 806c, 806d form four distinct optically isolated zones 810a, 810b, 810c, 810d. The optically isolated zone 810a is a circular zone centered on the first communication module 805. The optically isolated zones 810b, 810c, 810d are annular zones surrounding the optically isolated zone 810a with ever increasing diameters. As shown in FIG. 8B, the first communication module 805 comprises at least one first optical communication device 808a, 808b, 808c, 808d within each of the optically isolated zones 810a, 810b, 810b, 810d. Although not shown, the second communication module 812 would comprise at least one second optical communication device within each of the optically isolated zones 810a, 810b, 810c, 810d as well. Similar to the embodiment of FIG. 8A, the first and second optical communication devices within each optically isolated zone may communicate using modulated light and transmit data independent of data transferred in other optically isolated zones. These communication channels can be maintained during relative rotation of the first and second communication modules 805,812 as the integrity of the optically isolated zones 810a, 810b, 810c, 810d will be maintained during rotation.

Figure 9A:
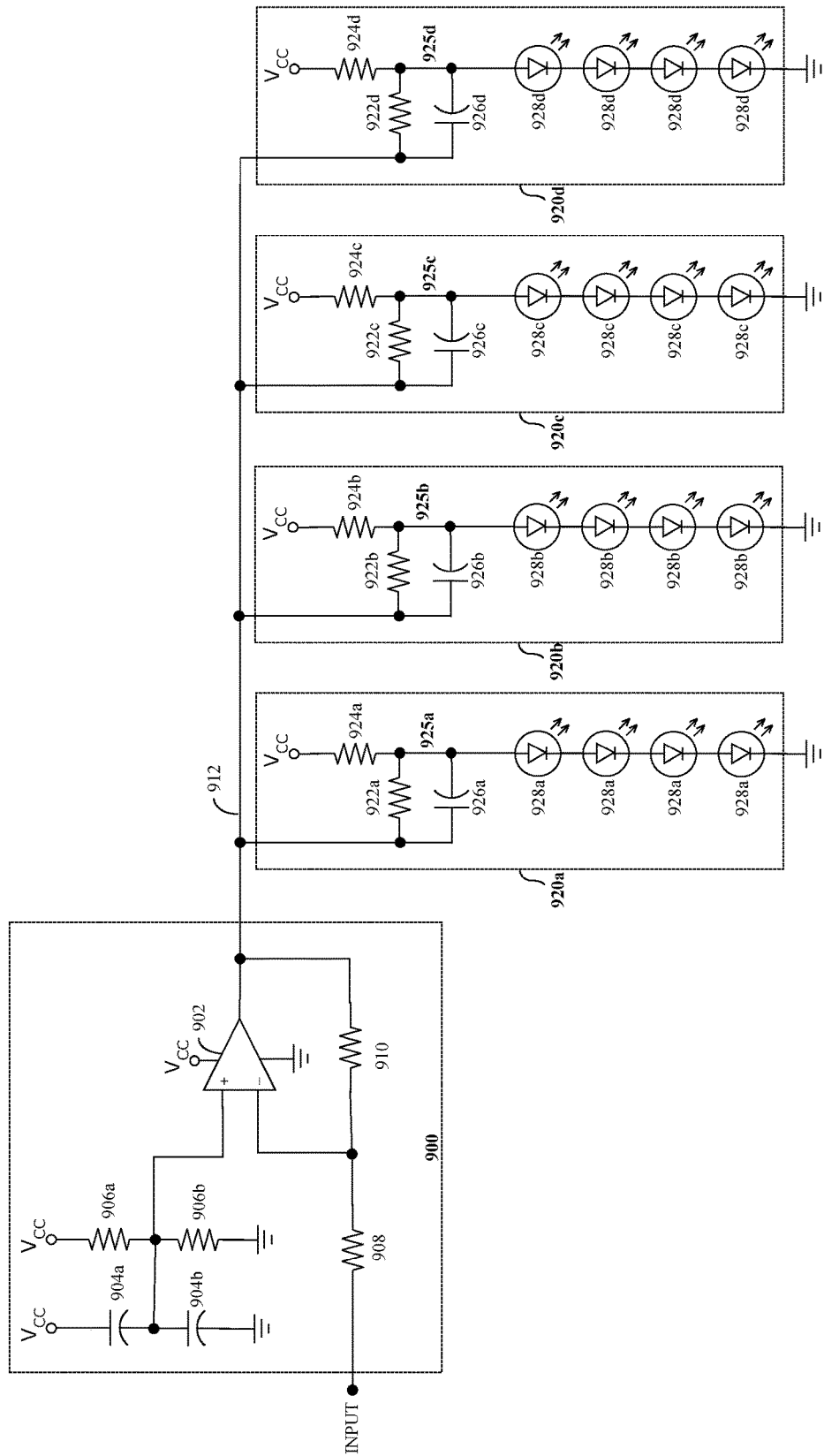
FIGS. 9A and 9B are sample circuit diagrams of an optical transmitter and an optical receiver that may be incorporated within the free-space optical communication apparatus of FIGS. 8A and 8B.
Figure 9B:
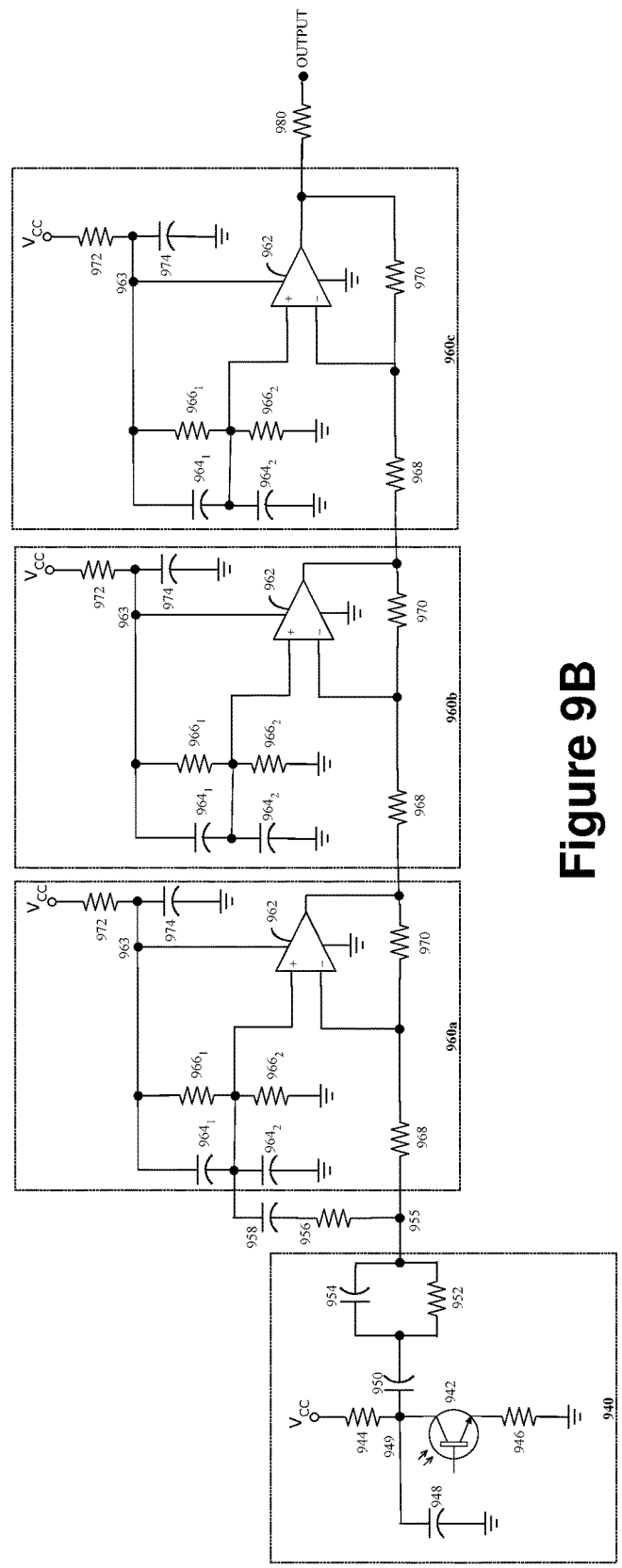

FIGS. 9A and 9B are sample circuit diagrams of an optical transmitter and an optical receiver that may be incorporated within the free-space optical communication apparatus of FIGS. 8A and 8B. The optical communication devices that are capable of optical transmission may comprise an electrical circuit similar to the circuit of FIG. 9A. The optical communication devices that are capable of optical reception may comprise an electrical circuit similar to the circuit of FIG. 9B. It should be understood that these circuit diagrams are only sample designs and one skilled in the art would understand that other optical transmitter and optical receiver designs could be implemented within embodiments of the present invention.

The optical transmitter of FIG. 9A comprises an amplification circuit 900 that receives a data input and outputs an amplified signal on a node 912, the node 912 being connected to a plurality of Light Emitting Diode (LED) circuits 920a,920b,920c,920d. The LED circuits 920a,920b,920c, 920d each comprise one or more LEDs which are linearly modulated by the amplified signal on the node 912. The amplification circuit 900 ensures that the data input signal has sufficient current to linearly modulate the intensity of the LEDs within the LED circuits 920a,920b,920c,920d. In some embodiments, there may only be a single LED circuit. When using a plurality of LED circuits, the circuits effectively provide duplicate outputs of modulated light. Each of the LED circuits 920a,920b,920c,920d may be considered a separate optical communication device in relation to the description of FIGS. 8A and 8B, where a plurality of optical communication devices may be implemented on one of the communication modules 805,812 within one of the optically isolated zones.

In the particular implementation of FIG. 9A, the amplification circuit 900 comprises: an operational amplifier 902 powered between a power rail Vcc and ground and having positive and negative inputs; two capacitors 904a, 904b that form a capacitive divider between the power rail Vcc and ground and are connected together at the positive input to the operational amplifier 902; two resistors 906a, 906b that form a resistive divider between the power rail Vcc and ground and are connected together at the positive input to the operational amplifier 902; an input resistor 908 coupled between the input signal and the negative input to the operational amplifier 902; and a feedback resistor 910 connected between the negative input and the output of the operational amplifier 902. In one particular example, the operational amplifier 902 comprises a LM6181 component; the capacitors 904a, 904b are 470 µF; the resistors 906a, 906b are 1 kΩ; the input resistor 908 is 330Ω; and the feedback resistor is 900Ω. It should be understood that other components could be used within an amplification circuit and other values for the components could be used. In one sample implementation, the input signal is an NTSC video signal. Other input signals that may comprise video, audio or other data in various formats may also be used.

In the particular implementation of FIG. 9A, the LED circuit 920a comprises: a resistor 922a and a capacitor 926a connected in parallel between the node 912 (output of the amplification circuit 900) and an LED voltage node 925a; a pull-up resistor 924a connected between the power rail Vcc and the LED voltage node 925a; and one or more LEDs 928a coupled in series between the LED voltage node 925a and ground. In one particular example, the resistor 922a is 330Ω; the capacitor 926a is 200 pF; the resistor 924a is 50Ω; and the LEDs are a mid-power LED that typically operates at 50 to 150 mA. In FIG. 9A, the other LED circuits 920b, 920c, 920d comprise identical components to the LED circuit 920a. In the example shown, there are four LEDs in series within each LED circuit 920a, 920b, 920c, 920d which would result in approximately a 12V forward voltage. It should be understood that other components could be used within the LED circuits, other numbers of LEDs could be implemented and other values for the components could be used. The output from the LED circuits would be light that is modulated based upon the input signal.

The optical receiver of FIG. 9B comprises an optical detection circuit 940 that outputs a signal at a node 955 in response to light detected, the node 955 being coupled to a set of three amplification circuits 960a, 960b, 960c. In this particular example circuit, the optical detection circuit 940 comprises a phototransistor 942 with bandwidth up to 3 MHz before a 3 dB rolloff in response, which is corrected by high pass circuits in the form of a series capacitor network that sharpens the signal up to 10 MHz from 3 MHz where it otherwise falls off. Also, in this particular example circuit, the amplification circuits 960a, 960b, 960c are high bandwidth amplifiers that function up to 10 MHz with good linearity. In some embodiments, less than three amplification circuits may be used while, in other embodiments, more than three may be implemented. Three amplification circuits in series as shown in FIG. 9B is sufficient to reconstitute a common NTSC video signal that has been transmitted optically by light with satisfactory linear characteristics.

In the particular implementation of FIG. 9B, the optical detection circuit 940 comprises the phototransistor 942 coupled in series with a resistor 946 between a node 949 and ground; a resistor 944 coupled between the supply rail Vcc and the node 949; a capacitor 948 coupled between the node 949 and ground; and a capacitor 950 coupled in series with a resistor/capacitor circuit comprising a resistor 952 and a capacitor 954 coupled in parallel, the capacitor 950 and the resistor/capacitor circuit being coupled in series between the node 949 and a pre-amplified output node 955. In one particular example, the resistor 946 is 270Ω; the resistor 944 is 22Ω; the capacitor 948 comprises three capacitors in parallel, one at 1000 pF, one at 1 μF and one at 470 μF; the capacitor 950 comprises two capacitors in series, each at 470 μF; the resistor 952 is 5 KΩ; and the capacitor 954 is 300 pF. It should be understood that other components could be used within an optical detection circuit and other values for the components could be used.

In the particular implementation of FIG. 9B, the amplification circuit 960a comprises: an operational amplifier 962 powered between a power node 963 and ground and having positive and negative inputs; two capacitors $964_1$, $964_2$ that form a capacitive divider between the power node 963 and ground and are connected together at the positive input to the operational amplifier 962; two resistors $966_1$, $966_2$ that form a resistive divider between the power node 963 and ground and are connected together at the positive input to the operational amplifier 962; an input resistor 968 coupled between the pre-amplified output node 955 and the negative input to the operational amplifier 962; a feedback resistor 970 connected between the negative input and the output of the operational amplifier 962; a resistor 972 coupled between the supply rail Vcc and the power node 963; and a capacitor 974 coupled between the power node 963 and ground. In one particular example, the operational amplifier 962 comprises a LM6181 component; the capacitors 964a, 964b are 470 μF; the resistors 966a, 966b are 1 kΩ; the input resistor 968 is 100Ω; the feedback resistor 970 is 2 KΩ; the resistor 972 is 1Ω; and the capacitor 974 is 470 μF. It should be understood that other components could be used within an amplification circuit and other values for the components could be used. In FIG. 9B, each of the amplification circuits 960a, 960b, 960c are identical though they could be different in some implementations. Further, the circuit of FIG. 9B comprises a resistor 956 and a capacitor 958 that are coupled in series between the pre-amplified output node 955 and the positive input to the operational amplifier 962 within the first amplification circuit 960a; and an output resistor 980 coupled between the output of the operational amplifier 962 of the third amplification circuit 960c and an output signal to the circuit of FIG. 9B. In one example implementation, the resistor 956 is 13 KΩ; the capacitor 958 is 1 μF; and the output resistor 980 is 100Ω.

In an alternative implementation, the optical communication devices capable of optical transmission could be implemented as an optical transmitter that generates a 12 MHz or higher carrier wave that is frequency or amplitude modulated at the transmitter input. The corresponding optical communication device capable of optical reception could be implemented to detect a higher frequency response and frequency or amplitude demodulate the incoming signal. The on/off nature of LEDs lends itself well to a physical layer of frequency modulation.

The specific sample circuits as described with reference to FIGS. 9A and 9B are reasonably linear over a range of between about 50 Hz and 6 MHz, which allows for signals with amplitude-like modulation and signal-to-noise ratio characteristics similar to NTSC to pass, such as PAL. There are other signaling techniques, however, such as frequency modulation, pulse width, and pulse position modulation that can also form the basis of communication of the physical channel over light. It should be understood that data may contain a wide variety of content with a wide variety of formats or modulation techniques. In particular implementations, the data could be data packets, audio, video, text, etc.

It should be understood that in the implementation of the data transfer apparatus 150, the encasement bases 702, 802 may be coupled to the frame 102 while the covers 704, 804 may be coupled to the rotatable element 104. In alternative embodiments, the encasement bases 702, 802 may be coupled to the rotatable element 104 while the covers 704, 804 may be coupled to the frame 102. Other mechanical changes may also be implemented when integrating the data transfer apparatus 150 within the cable reel 100. The data transfer apparatus 150 effectively provides a data transfer capability while one portion of the apparatus is static while another portion of the apparatus is operable to rotate relative to the static portion. This allows for transfer of high bandwidth data without requiring physical contact between elements to physically transfer the data.

Figure 10:
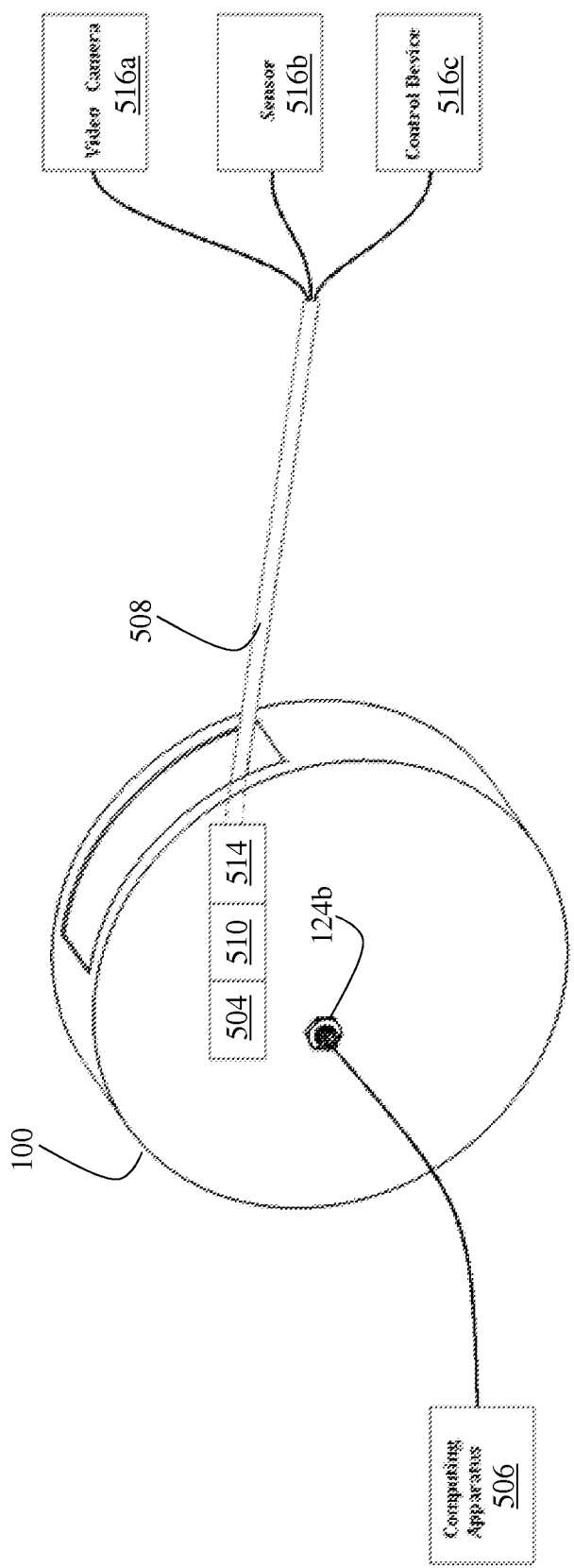
FIG. 10 is a logical system diagram according to an alternative embodiment of the present invention.

FIG. 10 is a logical system diagram similar to FIG. 5 according to an alternative embodiment of the present invention. In this alternative embodiment, the MOCA 504 is integrated with the frame 102 of the cable reel 100 and the MOCA 514 is integrated with the rotatable element 104 of the cable reel 100. In this case, the cable reel 100 may be connected to a computing apparatus 1000 at the connector 124b via a cable that may communicate data in Ethernet format. Both data and DC power can be communicated via the cable to the MOCA 504. The MOCA 504 can decouple the DC power and electrically couple the DC voltages via the torsional springs of the cable reel 100 in order to power the MOCA 514 which is integrated with the rotatable element 104 and may rotate relative to the MOCA 504. The MOCAs 504, 514 can convert data between Ethernet format and a high frequency analog data format that can be transferred via the data transfer apparatus 150 to the MOCA 514. The MOCA 514 can be powered by the DC voltages electrically coupled through the torsional springs. The MOCA 514 can output DC power over the cable 508 and further communicate data through the cable. In this case, the cable 508 may be an Ethernet cable. The cable 508 can be wrapped around the rotatable element 104 and unwrapped to connect to remote devices such as video device 516a, sensor 516b and/or control device 516c. The DC power over the cable 508 can be used to power the remote devices 516a, 516b, 516c. The MOCA 514 can communicate with the remote devices 516a, 516b, 516c via the cable 508.

Figure 11B:
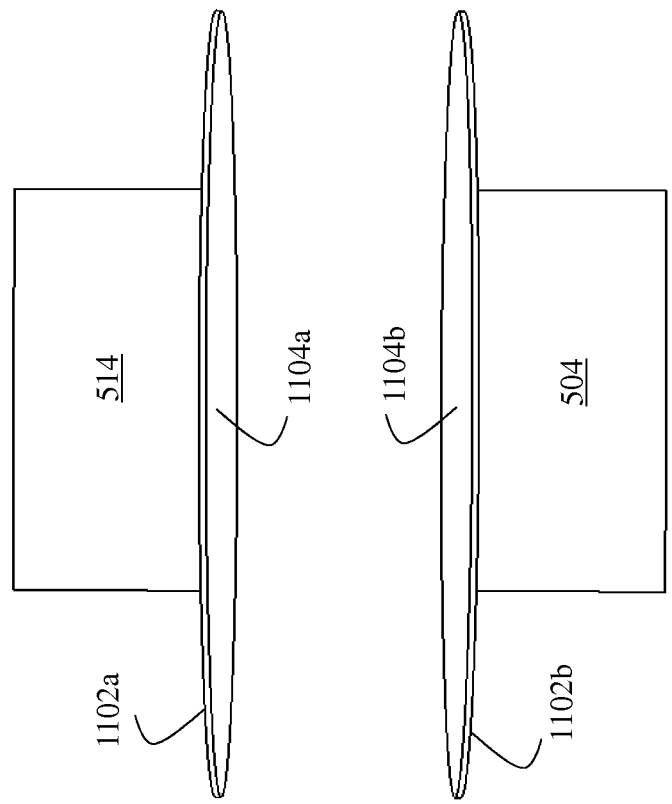
FIGS. 11A and 11B are breakout views of implementations of the data transfer apparatus of FIGS. 4A and 4B according to alternative embodiments of the present invention.
Figure 11A:
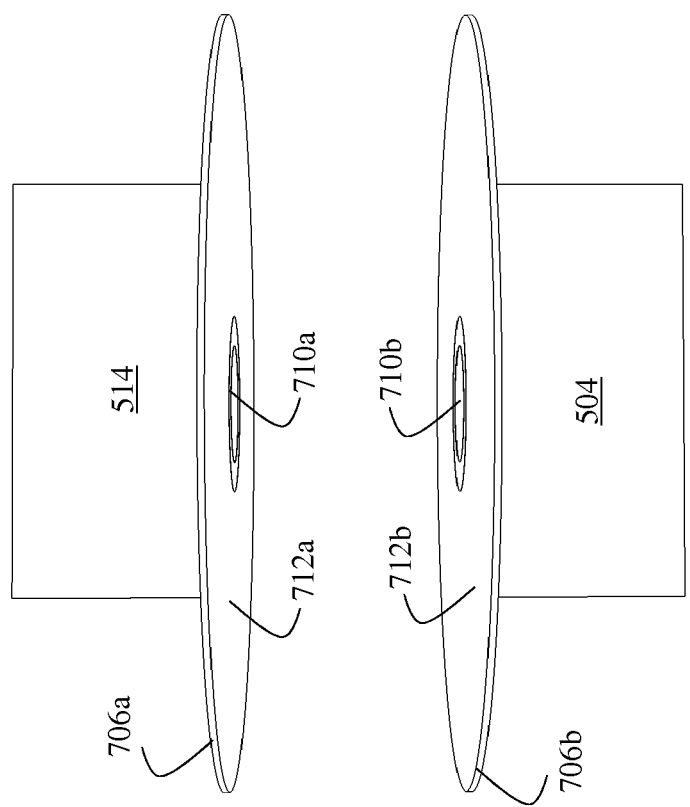

FIGS. 11A and 11B are breakout views of implementations of the data transfer apparatus of FIGS. 4A and 4B according to alternative embodiments of the present invention. In FIG. 11A, the first and second capacitive plates 706a, 706b are implemented as previously described with reference to FIGS. 7A, 7B and 7C. In particular, the capacitive plate 706a may comprise a circular disk with a circular copper track 710a that is centered on the circular disk and is of a first diameter and an annular copper track 712a that surrounds the circular copper track 710a and is of a second diameter. As shown, the annular copper track 712a is effectively an annulus with an outer diameter equal to the second diameter and an inner diameter slightly larger than the first diameter. In this design, the circular and annular copper tracks 710a, 712a are separated by a small etching so that each of the tracks is electrically isolated. Similarly, the second capacitive plate 706b may comprise a circular disk with a circular copper track 710b that is centered on the circular disk and is of the first diameter and an annular copper track 712b that surrounds the circular copper track 710b and is of the second diameter. In the embodiment of FIG. 11A, the MOCA 504 and the MOCA 514 may communicate data over the capacitor that is formed between the circular copper tracks 710a, 710b and use the capacitor that is formed between the annular copper tracks 712a, 712b as shielding for the data communication.

In some embodiments, as shown in FIG. 11B, there is only a single capacitor formed between the two capacitive plates. In this implementation, the MOCAs 504, 514 are coupled to first and second capacitive plates 1102a, 1102b respectively. In this case, each of the capacitive plates 1102a, 1102b may comprise a circular disk with only a single copper track 1104a, 1104b respectively. As shown, the single copper track 1104a, 1104b may comprise the entire surface area of the capacitive plates 1102a, 1102b. In alternative embodiments, the copper tracks 1104a, 1104b may be smaller than the entire surface area of the capacitive plates 1102a, 1102b and the capacitive plates 1102a, 1102b may not be circular.

In some implementations in which the MOCAs 504, 514 are coupled to the data transfer apparatus 150, the MOCAs 504, 514 may be used to simply bridge an Ethernet signal over a gap between a fixed element such as the frame 102 and a rotating element such as the rotatable element 104. The MOCAs 504, 514 may be used to establish a robust ultra-high frequency (UHF) signal that can easily pass over a short divide such as that between the capacitive plates 706a, 706b; where the entire contents of the Ethernet signal is coded into the UHF signal under the MOCA standard and protocol and then decoded on the opposite side of the gap.

The capacitive plates 706a, 706b may comprise circuit board material which can also serve as a host to additional electronics on layers that are removed from the bottom, gap-facing layers which contain the copper tracks used to form one or more capacitors. In some embodiments, circuitry related to the MOCAs 504, 514 (ex. application specific chip or a MOCA chip-set) may be mounted on 2-or-more layer circuit boards whose input is Ethernet and whose output is an RF feed to the gap-facing capacitive plate portion of its respective circuit board. In some embodiments, the input may also be of the form power-over-Ethernet. In this case, the power may be decoupled from the data prior to the capacitive plate 706a and rerouted via a power coupling mechanism such as the torsional spring architecture previously described and coupled back to the data after the capacitive plate 706b. In this manner, the data and the power can independently be transferred between the frame 102 and the rotatable element 104.

Although various embodiments of the present invention have been described and illustrated, it will be apparent to those skilled in the art that numerous modifications and variations can be made without departing from the scope of the invention, which is defined in the appended claims.

What is claimed is:

1. An apparatus comprising:
a frame comprising an axle and a first optical communication device; and
a rotatable element operable to rotate on the axle and comprising a second optical communication device;
wherein the first and second optical communication devices being adapted to optically communicate with each other during rotation of the rotatable element relative to the frame; and wherein the first and second optical communication devices are located within an optically isolated zone formed by the frame and the rotatable element.

2. The apparatus according to claim 1, wherein the rotatable element has an outer surface surrounding the axle adapted to have a cable wrapped, the second optical communication device being adapted to be coupled to the cable.

3. The apparatus according to claim 1, wherein the optically isolated zone is maintained by the frame and the rotatable element during rotation of the rotatable element relative to the frame.

4. The apparatus according to claim 1, wherein the optically isolated zone is formed by a wall surrounding the first and second optical communication devices, the wall being coupled to one of the frame and the rotatable element.

5. The apparatus according to claim 4, wherein the wall surrounding the first and second optical communication devices is cylindrical and centered on the axle.

6. The apparatus according to claim 1, wherein the frame comprises a first cylindrical wall surrounding the first optical communication device and the rotatable element comprises a second cylindrical wall surrounding the second optical communication device, the first and second cylindrical walls together forming the optically isolated zone.

7. The apparatus according to claim 1, wherein the first optical communication device comprises an optical receiver and the second optical communication device comprises an optical transmitter operable to communicate data from the rotatable element to the optical receiver of the frame using free-space optical communications within the optically isolated zone.

8. The apparatus according to claim 1, wherein the second optical communication device comprises an optical receiver and the first optical communication device comprises an optical transmitter operable to communicate data from the frame to the optical receiver of the rotatable element using free-space optical communications within the optically isolated zone.

9. The apparatus according to claim 1, wherein both the first and second optical communication devices comprise an optical receiver and an optical transmitter; wherein the optical transmitter of the first optical communication device is operable to communicate data from the frame to the optical receiver of the second optical communication device of the rotatable element using free-space optical communications within the optically isolated zone and the optical transmitter of the second optical communication device is operable to communicate data from the rotatable element to the optical receiver of the first optical communication device of the frame using free-space optical communications within the optically isolated zone.

10. The apparatus according to claim 1, wherein the frame comprises a plurality of first optical communication devices, each of the first optical communication devices comprising an optical receiver, and the second optical communication device comprises an optical transmitter operable to communicate data from the rotatable element to the optical receivers of the frame using free-space optical communications within the optically isolated zone; whereby the plurality of optical receivers provide a plurality of locations for reception of optical communications from the optical transmitter.

11. The apparatus according to claim 1, wherein the rotatable element comprises a plurality of second optical communication devices, each of the second optical communication devices comprising an optical receiver, and the first optical communication device comprises an optical transmitter operable to communicate data from the rotatable element to the optical receivers of the rotatable element using free-space optical communications within the optically isolated zone; whereby the plurality of optical receivers provide a plurality of locations for reception of optical communications from the optical transmitter.

12. The apparatus according to claim 1, wherein the second optical communication device comprises an optical receiver and the frame comprises a plurality of first optical communication devices, each of the first optical communication devices comprising an optical transmitter operable to communicate data from the frame to the optical receiver of the rotatable element using free-space optical communications within the optically isolated zone; whereby the plurality of optical transmitters provide a plurality of locations for transmission of optical communications to the optical receiver.

13. The apparatus according to claim 1, wherein the first optical communication device comprises an optical receiver and the rotatable element comprises a plurality of second optical communication devices, each of the second optical communication devices comprising an optical transmitter operable to communicate data from the rotatable element to the optical receiver of the frame using free-space optical communications within the optically isolated zone; whereby the plurality of optical transmitters provide a plurality of locations for transmission of optical communications to the optical receiver.

14. The apparatus according to claim 1, wherein the frame comprises a plurality of first optical communication devices and the rotatable element comprises a plurality of second optical communication devices, at least one first optical communication device being paired with at least one second optical communication device for optically communicating with each other; wherein each pair of first and second optical communication devices are located within a separate optically isolated zone of a plurality of optically isolated zones formed by the frame and the rotatable element.

15. The apparatus according to claim 14, wherein each of the optically isolated zones are maintained by the frame and the rotatable element during rotation of the rotatable element relative to the frame.

16. The apparatus according to claim 14, wherein the plurality of optically isolated zones are formed by a plurality of cylindrical walls of different diameters centered on the axle and coupled to one of the frame and the rotatable element; wherein the plurality of cylindrical walls form a central circular optically isolated zone and one or more annular optically isolated zones surrounding the central optically isolated zone.

17. The apparatus according to claim 14, wherein each of the pairs of first and second optical communication devices are operable to communicate data to each other independently.

18. The apparatus according to claim 1, wherein at least one of the first and second optical communication devices comprises an optical transmitter, the optical transmitter comprising an amplifier operable to amplify an input signal and a plurality of light emitting diode circuits operable to adjust intensity in response to the amplified input signal.

19. The apparatus according to claim 1, wherein at least one of the first and second optical communication devices comprises an optical receiver, the optical receiver comprising a phototransistor circuit operable to output a voltage and a plurality of amplifiers operable to output an amplified version of the voltage.

20. The apparatus according to claim 1 further comprising an electrical connection element adapted to electrically connect a first node in the frame to a second node in the rotatable element independent of the optical communication between the first and second optical communication devices.

21. The apparatus according to claim 20, wherein the electrical connection element comprises a torsional spring having windings surrounding the axle with a first end coupled to the axle and a second end coupled to the rotatable element; wherein the torsional spring is conductive and operable to electrically connect the first node in the frame to the second node in the rotatable element.

22. The apparatus according to claim 21, wherein the first node is electrically coupled to the first optical communication device and the second node is electrically coupled to the second optical communication device; the frame comprising a first isolation circuit adapted to prevent data at the first node from being transmitted to the first end of the torsional spring and the rotatable element comprising a second isolation circuit adapted to prevent data at the second node from being transmitted to the second end of the torsional spring.

23. An apparatus comprising:
a frame comprising an axle and a first optical communication device; and
a rotatable element operable to rotate on the axle and comprising a second optical communication device;
wherein the first and second optical communication devices being adapted to optically communicate with each other during rotation of the rotatable element relative to the frame; and wherein at least one of the first and second optical communication devices comprises an optical transmitter, the optical transmitter comprising an amplifier operable to amplify an input signal and a plurality of light emitting diode circuits operable to adjust intensity in response to the amplified input signal.

24. The apparatus according to claim 23, wherein the rotatable element has an outer surface surrounding the axle adapted to have a cable wrapped, the second optical communication device being adapted to be coupled to the cable.

25. The apparatus according to claim 23, wherein at least one of the first and second optical communication devices comprises an optical receiver, the optical receiver comprising a phototransistor circuit operable to output a voltage and a plurality of amplifiers operable to output an amplified version of the voltage.

26. An apparatus comprising:
a frame comprising an axle and a first optical communication device;
a rotatable element operable to rotate on the axle and comprising a second optical communication device; the first and second optical communication devices being adapted to optically communicate with each other during rotation of the rotatable element relative to the frame; and
an electrical connection element adapted to electrically connect a first node in the frame to a second node in the rotatable element independent of the optical communication between the first and second optical communication devices.

27. The apparatus according to claim 26, wherein the rotatable element has an outer surface surrounding the axle adapted to have a cable wrapped, the second optical communication device being adapted to be coupled to the cable.

28. The apparatus according to claim 26, wherein at least one of the first and second optical communication devices comprises an optical transmitter, the optical transmitter comprising an amplifier operable to amplify an input signal and a plurality of light emitting include circuits operable to adjust intensity in response to the amplified input signal.

29. The apparatus according to claim 26, wherein the electrical connection element comprises a torsional spring having windings surrounding the axle with a first end coupled to the axle and a second end coupled to the rotatable element; wherein the torsional spring is conductive and operable to electrically connect the first node in the frame to the second node in the rotatable element.

30. The apparatus according to claim 29, wherein the first node is electrically coupled to the first optical communication device and the second node is electrically coupled to the second optical communication device; the frame comprising a first isolation circuit adapted to prevent data at the first node from being transmitted to the first end of the torsional spring and the rotatable element comprising a second isolation circuit adapted to prevent data at the second node from being transmitted to the second end of the torsional spring.

* * * * *